United States Patent
Nakaoka et al.

(10) Patent No.: US 12,060,494 B2
(45) Date of Patent: Aug. 13, 2024

(54) ACTINIC-RAY-CURABLE COATING COMPOSITION, CURED COATING FILM, COATED ARTICLE, AND METHOD FOR FORMING COATING FILM

(71) Applicant: KANSAI PAINT CO., LTD., Hyogo (JP)

(72) Inventors: Haruka Nakaoka, Kanagawa (JP); Kota Goto, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 423 days.

(21) Appl. No.: 17/431,646

(22) PCT Filed: Feb. 28, 2020

(86) PCT No.: PCT/JP2020/008202
§ 371 (c)(1),
(2) Date: Aug. 17, 2021

(87) PCT Pub. No.: WO2020/175664
PCT Pub. Date: Sep. 3, 2020

(65) Prior Publication Data
US 2022/0119668 A1    Apr. 21, 2022

(30) Foreign Application Priority Data
Feb. 28, 2019 (JP) .................. 2019-036452

(51) Int. Cl.
*C09D 133/14* (2006.01)
*C09D 7/63* (2018.01)

(52) U.S. Cl.
CPC ............ *C09D 133/14* (2013.01); *C09D 7/63* (2018.01)

(58) Field of Classification Search
None
See application file for complete search history.

(56) References Cited

U.S. PATENT DOCUMENTS

| | | | |
|---|---|---|---|
| 6,579,618 B1 | 6/2003 | Ishikawa et al. | |
| 9,334,420 B2 * | 5/2016 | Saitou ................ | C08J 7/046 |
| 2001/0020049 A1 | 9/2001 | Takase et al. | |
| 2011/0009516 A1 | 1/2011 | Tsubokura et al. | |
| 2017/0009001 A1 | 1/2017 | Takenouchi et al. | |
| 2018/0312697 A1 | 11/2018 | Gotou et al. | |
| 2019/0359835 A1 | 11/2019 | Hishinuma et al. | |
| 2020/0002556 A1 | 1/2020 | Sato et al. | |

FOREIGN PATENT DOCUMENTS

| | | |
|---|---|---|
| CN | 1297460 A | 5/2001 |
| CN | 1314933 A | 9/2001 |
| CN | 106029727 A | 10/2016 |
| CN | 107089914 A | 8/2017 |
| CN | 108137981 A | 6/2018 |
| CN | 108864927 A | 11/2018 |
| JP | 5-70535 A | 3/1993 |
| JP | 8-92342 A | 4/1996 |
| JP | 2004359767 A | 12/2004 |
| JP | 2005015755 A | 1/2005 |
| JP | 2011-157419 A | 8/2011 |
| JP | 2014-141654 A | 8/2014 |
| JP | 2016-6161 A | 1/2016 |
| JP | 2017-165870 A | 9/2017 |
| JP | 2018115223 A | 7/2018 |
| KR | 100671058 B1 | 1/2007 |
| TW | 200911934 A | 5/1997 |
| WO | 2017/073522 A1 | 5/2017 |
| WO | 2018173785 A1 | 9/2018 |

OTHER PUBLICATIONS

Communication dated Jan. 2, 2023 from the Intellectual Property India Patent Office in application No. 202117035585.
Office Action dated Aug. 2, 2023, issued by Indian Patent Office in counterpart Indian Patent Application No. 202117035585.
Communication dated Feb. 16, 2023 issued by the Indonesia Patent Office in counterpart Indonesian Patent Application No. P00202106346.
Extended European Search Report dated Oct. 24, 2022, issued by the European Patent Office in counterpart European Patent Application No. 20762369.5.
Communication dated Dec. 7, 2021 issued by the State Intellectual Property Office of P.R. China in counterpart Chinese Application No. 202080017204.X.
International Search Report (PCT/ISA/210) dated May 26, 2020, issued by the International Searching Authority in counterpart International Application No. PCT/JP2020/008202.
Written Opinion (PCT/ISA/237) dated May 26, 2020, issued by the International Searching Authority in counterpart International Application No. PCT/JP2020/008202.
Communication dated May 19, 2022 issued by China National Intellectual Property Administration in counterpart CN Application No. 202080017204.X.

* cited by examiner

*Primary Examiner* — Sanza L. McClendon
(74) *Attorney, Agent, or Firm* — Sughrue Mion, PLLC

(57) ABSTRACT

An active energy ray-curable coating composition, includes the following components (A), (B), (C), and (D): (A) urethane (meth)acrylate having a polycarbonate skeleton and three or more polymerizable unsaturated groups in one molecule and having a weight average molecular weight in a range of 10,000 to 40,000; (B) urethane (meth)acrylate having a weight average molecular weight in a range of 1,000 or more and less than 10,000; (C) at least one compound selected from the group consisting of (c1) to (c3); and (D) a photopolymerization initiator.

15 Claims, No Drawings

ACTINIC-RAY-CURABLE COATING COMPOSITION, CURED COATING FILM, COATED ARTICLE, AND METHOD FOR FORMING COATING FILM

CROSS-REFERENCE TO RELATED APPLICATIONS

This application is a National Stage of International Application No. PCT/JP2020/008202 filed Feb. 28, 2020, claiming priority based on Japanese Patent Application No. 2019-036452, filed Feb. 28, 2019, the contents of all of which are incorporated herein by reference in their entirety.

TECHNICAL FIELD

The present invention relates to an active energy ray-curable coating composition, a cured coating film, a coated article, and a method for forming a coating film.

BACKGROUND ART

In related art, an active energy ray-curable resin composition that is cured by an active energy ray such as an ultraviolet ray or a radioactive ray has been widely used for applications such as a coating material, an ink, and an adhesive. In general, a coating material such as a thermosetting coating material or a lacquer has a disadvantage that the productivity is poor because a product is wound, stacked, and transported after a certain period of time (cooling and drying) due to insufficient curing of a coating film immediately after completion. On the other hand, the active energy ray-curable resin composition can be typically cured in units of seconds and does not require heating, so that it is possible to perform high-speed curing and drying which cannot be achieved with a thermosetting coating material or a lacquer, and it is widely used for an application suitable for the high-speed curing and drying.

For example, Patent Literature 1 discloses an ultraviolet-curable resin composition containing, as essential components, a resin (A) obtained by reacting a compound (a-1) having at least one (meth)acryloyl group and a hydroxyl group in one molecule thereof, polycarbonate diol (a-2) having a molecular weight of 300 to 3000 and polyisocyanate (a-3) having an isocyanurate structure; and a compound (B) having both an (meth)acryloyl group and a group that generates a radical by light.

Patent Literature 2 discloses a radiation-curable resin composition containing the following components (A), (B) and (C): (A) urethane (meth)acrylate obtained by reacting (a) polycarbonate diol, (b) a diisocyanate compound, and (c) hydroxyalkyl (meth)acrylate; (B) urethane (meth)acrylate obtained by reacting (d) a polyol compound having three or more hydroxyl groups in one molecule thereof, (b) a diisocyanate compound, and (c) hydroxyalkyl (meth)acrylate; and (C) a reactive diluent.

CITATION LIST

Patent Literature

Patent Literature 1: JP-A-H5-70535
Patent Literature 2: JP-A-H8-92342

SUMMARY OF INVENTION

Technical Problem

However, in the techniques described in Patent Literatures 1 and 2, the curability, scratching resistance, and the like of the coating film obtained by the curable resin composition have been studied, but the substrate followability of the coating film has not been studied, and the effect thereof has been unknown.

The present invention has been made in view of the above circumstances of related art, and an object of the present invention is to provide an active energy ray-curable coating composition that can form a coating film excellent in substrate followability, adhesion, car-wash scratching resistance, hardness, and weather resistance.

Solution to Problem

As a result of intensive studies to solve the above problems, the present inventors have found that the above problems can be solved by containing the following (A), (B), (C), and (D), and have completed the present invention.

That is, the present invention relates to the following <1> to <10>.

<1> An active energy ray-curable coating composition containing the following components (A), (B), (C), and (D):

(A) urethane (meth)acrylate having a polycarbonate skeleton and three or more polymerizable unsaturated groups in one molecule and having a weight average molecular weight in a range of 10,000 to 40,000;

(B) urethane (meth)acrylate having a weight average molecular weight in a range of 1,000 or more and less than 10,000;

(C) at least one compound selected from the group consisting of: a polymerizable unsaturated compound (c1) having three or more polymerizable unsaturated groups in one molecule and having a weight average molecular weight in a range of 280 or more and less than 1,000; a polymerizable unsaturated compound (c2) having an alicyclic structure and one or two polymerizable unsaturated groups in one molecule and having a weight average molecular weight in a range of 200 or more and less than 1,000; and a (meth)acrylamide compound (c3) having a weight average molecular weight in a range of 110 or more and less than 1,000; and (D) a photopolymerization initiator.

<2> The active energy ray-curable coating composition according to <1>, in which the urethane (meth)acrylate (A) is a reaction product of polycarbonate diol (a1), a polyisocyanate compound (a2), and a polymerizable unsaturated compound (a3) having a hydroxyl group, and the polymerizable unsaturated compound (a3) contains at least a polymerizable unsaturated compound (a3') having a hydroxyl group and two or more polymerizable unsaturated groups in one molecule.

<3> The active energy ray-curable coating composition according to <2>, in which the polyisocyanate compound (a2) is a diisocyanate compound.

<4> The active energy ray-curable coating composition according to <2> or <3>, in which the polymerizable unsaturated compound (a3') is a polymerizable unsaturated compound (a3") having one hydroxy group and two or more polymerizable unsaturated groups in one molecule.

<5> The active energy ray-curable coating composition according to any one of <1> to <4>, in which a solid content of the component (A) is within a range of 10% by mass to 40% by mass, a solid content of the component (B) is within a range of 25% by mass to 70% by mass, and a solid content of the component (C) is within a range of 20% by mass to 50% by mass, with respect to a total solid content of the components (A), (B), and (C).

<6> The active energy ray-curable coating composition according to any one of <1> to <5>, further containing at least one of an ultraviolet absorber and a light stabilizer.

<7> The active energy ray-curable coating composition according to any one of <1> to <6>, in which a glass transition temperature of a cured coating film obtained by curing the active energy ray-curable coating composition is in a range of 40° C. to 90° C.

<8> A cured coating film obtained by curing the active energy ray-curable coating composition according to any one of <1> to <7> and having a molecular weight between crosslinks in a range of 200 g/mol to 900 g/mol.

<9> A coated article including, on an object to be coated, the cured coating film obtained by curing the active energy ray-curable coating composition according to any one of <1> to <7>.

<10> A method for forming a coating film, including: applying the active energy ray-curable coating composition according to any one of <1> to <7> on an object to be coated to form an uncured coating film; and irradiating the uncured coating film with an active energy ray to cure the uncured coating film.

Advantageous Effects of Invention

According to the present invention, it is possible to provide an active energy ray-curable coating composition that can form a coating film excellent in substrate followability, adhesion, car-wash scratching resistance, hardness, and weather resistance.

DESCRIPTION OF EMBODIMENTS

Hereinafter, the present invention will be described in detail, but these show examples of desirable embodiments, and the present invention is not specified in these contents.

In the present description, the term "(meth)acrylate" means acrylate or methacrylate. The term "(meth)acrylic acid" means acrylic acid or methacrylic acid. The term "(meth)acryloyl" means acryloyl or methacryloyl. The term "(meth)acrylamide" means acrylamide or methacrylamide.

Active Energy Ray-Curable Coating Composition

An active energy ray-curable coating composition according to the present invention (hereinafter, may be referred to as a coating composition according to the present invention) contains the following components (A), (B), (C), and (D).

(A) Urethane (meth)acrylate

Urethane (meth)acrylate (A) is urethane (meth)acrylate having a polycarbonate skeleton and three or more polymerizable unsaturated groups in one molecule thereof and having a weight average molecular weight in a range of 10,000 or more and 40,000 or less.

When the urethane (meth)acrylate (A) is contained, it is possible to form a coating film that has a crosslinked structure having a carbonate group and a urethane bond in the same molecular chain. In addition, since a molecular weight of the urethane (meth)acrylate (A) is large and the urethane (meth)acrylate (A) has a large number of polymerizable unsaturated groups, it is possible to form a coating film having a high crosslink density in which hydrogen bonds and cohesive force are strongly expressed, and it is considered that the coating film is excellent in substrate followability, adhesion, car-wash scratching resistance, hardness, and weather resistance.

Examples of the polymerizable unsaturated group include a (meth)acryloyl group, a vinyl group, a propenyl group, a butadienyl group, a styryl group, an ethynyl group, a cinnamoyl group, a maleate group, and an acrylamide group. Among these, from the viewpoint of curability, the (meth) acryloyl group is preferable, and the acryloyl group is more preferable.

When the number of polymerizable unsaturated groups in one molecule of the urethane (meth)acrylate (A) is 3 or more, the coating film formed by the coating composition according to the present invention is a coating film having a high crosslink density. The number of polymerizable unsaturated groups is preferably 3 to 10, and more preferably 4 to 6, from the viewpoint of hardness and substrate followability.

When a weight average molecular weight of the urethane (meth)acrylate (A) is 10,000 or more, a coating film excellent in the substrate followability and car-wash scratching resistance is formed. When the weight average molecular weight of the urethane (meth)acrylate (A) is 40,000 or less, a coating film excellent in adhesion, hardness, and weather resistance is formed.

The weight average molecular weight of the urethane (meth)acrylate (A) is preferably 10,000 to 30,000, more preferably 11,000 to 25,000, and still more preferably 12,000 to 18,000, from the viewpoint of the substrate followability, the adhesion, the car-wash scratching resistance, the hardness, and the weather resistance of the coating film to be formed.

The weight average molecular weight of the urethane (meth)acrylate (A) can be measured by gel permeation chromatography (GPC) under the following measurement conditions.

Device: HPLC-8220 (manufactured by Tosoh Corporation)
Column configuration: TSKgel Super HZ3000+TSKgel Super HZ1000 (all manufactured by Tosoh Corporation)
Detector: differential refractive index detector (RI detector)
Eluent: tetrahydrofuran
Flow rate of eluent: 0.6 mL/min
Temperature: 40° C.
Temperature rise rate: temperature constant without temperature rise
Calibration: polystyrene equivalent
Sample concentration: 0.01 g/5 mL The urethane (meth)acrylate (A) is preferably, for example, a reaction product of polycarbonate diol (a1), a polyisocyanate compound (a2), and a polymerizable unsaturated compound (a3) having a hydroxyl group, which will be described later.

The reaction product may be obtained by reacting only the polycarbonate diol (a1), the polyisocyanate compound (a2), and the polymerizable unsaturated compound (a3) having a hydroxyl group, or may be obtained by reacting the above components together with a polyol compound (a4) and/or a chain extension component (a5) of a hydroxyl group-containing compound as necessary.

Polycarbonate Diol (a1)

The polycarbonate diol (a1) is not particularly limited, and commonly used polycarbonate diol can be used. The polycarbonate diol (a1) can be obtained, for example, by a polycondensation reaction of diol and a carbonylation agent.

As the diol used in the production of the polycarbonate diol (a1), a dihydric alcohol having 2 to 10 carbon atoms, preferably 4 to 8 carbon atoms can be used. Specific examples thereof include aliphatic diol such as 1,2-propanediol, 1,3-propanediol, 1,3-butanediol, 1,4-butanediol, 1,5-pentanediol, 1,6-hexanediol, 1,7-heptanediol, 1,8-octanediol, 2-ethyl-1,6-hexanediol, 2-methyl-1,3-propanediol, 3-methyl-1,5-pentanediol, and neopentyl glycol; alicyclic diol such as 1,3-cyclohexanediol, 1,4-cyclohexanediol, and 1,4-cyclohexanedimethanol; aromatic diol such as p-xylene diol and p-tetrachloroxylene diol; and ether diol such as diethylene glycol and dipropylene glycol. The diol may be used alone or in combination of two or more.

As the diol used in the production of the polycarbonate diol (a1), from the viewpoint of the weather resistance and the hardness of the coating film of the coating composition containing the urethane (meth)acrylate (A) obtained by using the polycarbonate diol (a1), the aliphatic diol and/or the alicyclic diol is preferably used, and the aliphatic diol and the alicyclic diol are more preferably used in combination.

When the alicyclic diol is used as the diol used in the production of the polycarbonate diol (a1), a content of an alicyclic structure in the alicyclic diol is preferably in a range of 0.5% to 25% by mass, more preferably 5% to 20% by mass, and still more preferably 8% to 15% by mass with respect to a mass of the urethane (meth)acrylate (A), from the viewpoint of the weather resistance and the hardness of the coating film of the coating composition containing the urethane (meth)acrylate (A) obtained by using the alicyclic diol.

In the present invention, the alicyclic structure refers to a ring structure having no aromaticity (π-electron conjugated system), and is a concept including a ring structure only including a carbon atom and a ring structure containing a hetero atom as a constituent atom.

In the present invention, the content of the alicyclic structure is a theoretical value calculated based on a structural formula of a raw material used in synthesis of the compound and a usage ratio of the raw material.

As the diol used in the production of the polycarbonate diol (a1), from the viewpoint of the excellent weather resistance and hardness of the coating film of the coating composition containing the urethane (meth)acrylate (A) obtained by using the polycarbonate diol (a1), it is more preferable to use 1,6-hexanediol and one or more diols other than 1,6-hexanediol as a mixture, and it is still more preferable to use 1,6-hexanediol and at least one selected from the group consisting of 1,5-pentanediol, 1,4-butanediol, and 1,4-cyclohexanedimethanol as a mixture. Specific examples of the combination include a combination of 1,6-hexanediol and 1,5-pentanediol, a combination of 1,6-hexanediol and 1,4-butanediol, a combination of 1,6-hexanediol and 1,4-cyclohexanedimethanol, and a combination of 1,6-hexanediol, 1,5-pentanediol, and 1,4-cyclohexanedimethanol.

As the carbonylation agent used in the production of the polycarbonate diol (a1), a known carbonylation agent can be used. Specific examples thereof include alkylene carbonate, dialkyl carbonate, diallyl carbonate, phosgene, and one or a combination of two or more of these can be used. Among these, ethylene carbonate, propylene carbonate, dimethyl carbonate, diethyl carbonate, dibutyl carbonate, diphenyl carbonate, and the like are preferable.

As the polycarbonate diol (a1), a commercially available product can also be used. Examples of the commercially available product include "DURANOL-5650J" (trade name, diol component: 1,6-hexanediol and 1,5-pentanediol) and "DURANOL-4671" (trade name, diol component: 1,6-hexanediol and 1,4-butanediol) which are manufactured by Asahi Kasei Chemicals Corporation; "ETERNACOLL UH-100" (trade name, diol component: 1,6-hexanediol), "ETERNACOLL PH-100" (trade name, diol component: 1,6-hexanediol and 1,5-pentanediol), "ETERNACOLL UHC50-100" (trade name, caprolactone-modified product of 1,6-hexanediol), "ETERNACOLL UC-100" (trade name, diol component: 1,4-cyclohexanedimethanol), "ETERNACOLL UM-90 (1/1)" (trade name, diol component: 1,6-hexanediol and 1,4-cyclohexanedimethanol) which are manufactured by Ube Industries, Ltd.; "BENEBiOL NL1010DB" (trade name, diol component: 1,10-decanediol) and "BENEBiOL HS0840B" (trade name, diol component: isosorbide) which are manufactured by Mitsubishi Chemical Corporation; and "Kuraray polyol C-1090" (trade name, diol component: 3-methyl-1,5-pentanediol and 1,6-hexanediol) which is manufactured by Kuraray Co., Ltd.

Polyisocyanate Compound (a2)

The polyisocyanate compound (a2) is a compound having at least two isocyanate groups in one molecule thereof. Examples of the polyisocyanate compound (a2) include aliphatic polyisocyanates, alicyclic polyisocyanates, aromatic aliphatic polyisocyanates, aromatic polyisocyanates, and derivatives of these polyisocyanates. These may be used alone or in combination of two or more.

Examples of the aliphatic polyisocyanate include aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate, and methyl 2,6-diisocyanatohexanoate (common name: lysine diisocyanate); and aliphatic triisocyanates such as 2,6-diisocyanatohexanoic acid 2-isocyanatoethyl, 1,6-diisocyanato-3-isocyanatomethyl hexane, 1,4,8-triisocyanatooctane, 1,6,11-triisocyanatoundecane, 1,8-diisocyanato-4-isocyanatomethyl octane, 1,3,6-triisocyanatohexane, and 2,5,7-trimethyl-1,8-diisocyanato-5-isocyanatomethyl octane.

Examples of the alicyclic polyisocyanate include alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (commonly used name: isophorone diisocyanate), methyl-2,4-cyclohexane diisocyanate, methyl-2,6-cyclohexane diisocyanate, 1,3- or 1,4-bis(isocyanatomethyl)cyclohexane (commonly used name: hydrogenated xylylene diisocyanate) or a mixture thereof, methylenebis(1,4-cyclohexanediyl)diisocyanate (commonly used name: hydrogenated MDI), and norbornane diisocyanate; and alicyclic triisocyanates such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, and 6-(2-isocyanatoethyl)-2-isocyanatomethyl-2-(3-isocyanatopropyl)-bicyclo(2.2.1)heptane.

Examples of the aromatic aliphatic polyisocyanate include aromatic aliphatic diisocyanates such as methylenebis(1,4-phenylene)diisocyanate (commonly used name: MDI), 1,3- or 1,4-xylylene diisocyanate or a mixture thereof, ω,ω'-diisocyanato-1,4-diethylbenzene and 1,3- or 1,4-bis(1-isocyanato-1-methylethyl)benzene (commonly used name: tetramethylxylylene diisocyanate) or a mixture thereof, and aromatic aliphatic triisocyanates such as 1,3,5-triisocyanatomethylbenzene.

Examples of the aromatic polyisocyanate include aromatic diisocyanates such as m-phenylene diisocyanate, p-phenylene diisocyanate, 4,4'-diphenyl diisocyanate, 1,5-naphthalene diisocyanate, 2,4- or 2,6-tolylene diisocyanate or a mixture thereof, 4,4'-toluidine diisocyanate, and 4,4'-diphenyl ether diisocyanate; aromatic triisocyanates such as triphenylmethane-4,4',4''-triisocyanate, 1,3,5-triisocyanatobenzene, and 2,4,6-triisocyanatotoluene; and aromatic tetraisocyanates such as 4,4'-diphenylmethane-2,2',5,5'-tetraisocyanate.

Examples of the derivatives of the polyisocyanates include a dimer, a trimer, a biuret, an allophanate, a uretdione, a uretonimine, an isocyanurate, an oxadiazinetrione, a polymethylene polyphenyl polyisocyanate (crude MDI; polymeric MDI), and a crude TDI, of the polyisocyanate.

As the polyisocyanate compound (a2), a diisocyanate compound is preferably used from the viewpoint of the substrate followability and the scratching resistance of the coating film to be formed. Among these, the aliphatic diisocyanate and the alicyclic diisocyanate are preferable from the viewpoint of the substrate followability, the adhesion, the scratching resistance, the hardness, and the weather resistance of the coating film to be formed, and the alicyclic diisocyanate is more preferable from the viewpoint of the hardness and the weather resistance of the coating film to be formed.

Polymerizable Unsaturated Compound (a3)

The polymerizable unsaturated compound (a3) is a polymerizable unsaturated compound having a hydroxyl group.

The polymerizable unsaturated compound (a3) preferably contains a polymerizable unsaturated compound (a3') having a hydroxyl group and two or more polymerizable unsaturated groups in at least one molecule thereof, from the viewpoint of the substrate followability, the adhesion, the scratching resistance, the hardness, and the weather resistance of the coating film to be formed.

A content of the polymerizable unsaturated compound (a3') in the polymerizable unsaturated compound (a3) is preferably in a range of 50% by mass to 100% by mass, more preferably in a range of 60% by mass to 100% by mass, and still more preferably in a range of 70% by mass to 100% by mass, from the viewpoint of the substrate followability, the adhesion, the scratching resistance, the hardness, and the weather resistance.

The polymerizable unsaturated compound (a3') is preferably a polymerizable unsaturated compound (a3'') having one hydroxyl group and two or more polymerizable unsaturated groups in one molecule thereof, from the viewpoint of the substrate followability, the adhesion, the scratching resistance, the hardness, and the weather resistance of the coating film to be formed.

The polymerizable unsaturated compound (a3) preferably has three or more polymerizable unsaturated groups in one molecule thereof, more preferably three to five polymerizable unsaturated groups in one molecule thereof, and still more preferably three polymerizable unsaturated groups in one molecule thereof, from the viewpoint of the hardness and weather resistance of the coating film to be formed.

Examples of the polymerizable unsaturated compound (a3) include 2-hydroxyethyl (meth)acrylate, 2-hydroxypropyl (meth)acrylate, 3-hydroxypropyl (meth)acrylate, 4-hydroxybutyl (meth)acrylate, glycerin di(meth)acrylate, trimethylolpropane di(meth)acrylate, pentaerythritol di(meth)acrylate, pentaerythritol tri(meth)acrylate, dipentaerythritol penta(meth)acrylate, and tris(2-hydroxyethyl)isocyanurate di(meth)acrylate. Among these, pentaerythritol tri(meth)acrylate and/or dipentaerythritol penta(meth)acrylate are preferably used, pentaerythritol triacrylate and/or dipentaerythritol pentaacrylate are more preferably used, and pentaerythritol triacrylate is still more preferably used, from the viewpoint of the hardness and the weather resistance of the coating film to be formed.

The polymerizable unsaturated compound (a3) may be used alone or in combination of two or more thereof.

Polyol Compound (a4)

The polyol compound (a4) may be the same as a polyol compound (b3) described later.

Chain Extension Component (a5) of Hydroxyl Group-Containing Compound

The chain extension component (a5) of the hydroxyl group-containing compound may be the same as a chain extension component (b4) of the hydroxyl group-containing compound described later.

Synthesis of Urethane (meth)acrylate

The urethane (meth)acrylate (A) can be synthesized, for example, by subjecting the polycarbonate diol (a1), the polyisocyanate compound (a2), and the polymerizable unsaturated compound (a3), and if necessary, the polyol compound (a4) and/or the chain extension component (a5) of the hydroxyl group-containing compound to a known urethanization reaction.

With the urethanization reaction, the urethane (meth)acrylate (A) may contain a component other than (a1) to (a5).

As the component other than (a1) to (a5), for example, a chain extender can be used. As the chain extender, a known chain extender can be used, and examples thereof include water, a low molecular weight polyol, and a polyamine. Examples of the chain extender include those described in "Latest Polyurethane Applied Technology" (CMC Co., Ltd., published in 1985).

The urethanization reaction can be performed in an organic solution. Examples of the organic solvent include aromatic hydrocarbon solvents such as toluene and xylene; ketone solvents such as acetone, methyl ethyl ketone, methyl isobutyl ketone, and cyclohexanone; and ester solvents such as ethyl acetate, propyl acetate, isobutyl acetate, and butyl acetate. These may be used alone or as a mixture of two or more thereof.

A reaction temperature is preferably room temperature to 100° C., and a reaction time is preferably 1 hour to 10 hours.

In the urethanization reaction, a progress state of the reaction can be confirmed by tracing an isocyanate equivalent of the reaction solution. The isocyanate equivalent can be determined by back titration using dibutylamine. Specifically, the back titration can be performed by adding an excessive amount of dibutylamine to a sample to react with the sample, using bromophenol blue as a titration indicator, and titrating the remaining dibutylamine with an aqueous hydrochloric acid solution.

In the urethanization reaction, an organic tin catalyst such as dibutyltin dilaurate, dibutyltin diethylhexoate, and dibutyltin sulfite may be used as necessary. An amount of the catalyst is preferably 0.01 part by mass to 1.0 part by mass, and more preferably 0.1 part by mass to 0.5 part by mass, with respect to 100 parts by mass of a total amount of the reaction raw materials.

A polymerization inhibitor such as hydroquinone monomethyl ether may also be used. When the polymerization inhibitor is used, an addition amount thereof is preferably 0.01 part by mass to 1.0 part by mass with respect to 100 parts by mass of the total amount of the reaction raw materials.

When the urethane (meth)acrylate (A) has an alicyclic structure, a content of the alicyclic structure in the urethane (meth)acrylate (A) is preferably 5% by mass to 30% by mass, more preferably 10% by mass to 25% by mass, and still more preferably 15% by mass to 20% by mass, with respect to a mass of the urethane (meth)acrylate (A), from the viewpoint of the substrate followability, the adhesion, the scratching resistance, the hardness, the weather resistance, and the like of the coating film to be formed.

As the urethane (meth)acrylate (A), a commercially available product can also be used. Examples of the commercially available product include "UA0036B", "UA0065B", and "UA0499B" which are manufactured by Ube Industries, Ltd.

The urethane (meth)acrylate (A) preferably has a B-type viscosity of 500 mPa·s to 50,000 mPa·s, more preferably 1,000 mPa·s to 10,000 mPa·s, and still more preferably 1,500 mPa·s to 5,000 mPa·s at 25° C. when diluted with butyl acetate to a solid content of 50% by mass, from the viewpoint of the substrate followability, the adhesion, the scratching resistance, the hardness, the weather resistance, and the like of the coating film to be formed.

In the present specification, the B-type viscosity can be measured using a Brookfield viscometer under the conditions of 25° C. and 6 rpm.

The urethane (meth)acrylate (A) may be used alone or in combination of two or more thereof.

(B) Urethane (meth)acrylate

Urethane (meth)acrylate (B) is urethane (meth)acrylate having a weight average molecular weight in a range of 1,000 or more and less than 10,000. When the weight average molecular weight is 1,000 or more, the substrate followability and the car-wash scratching resistance of the coating film to be obtained are good. When the weight average molecular weight is less than 10,000, the adhesion, the hardness, and the weather resistance of the coating film to be obtained are good.

The weight average molecular weight of the urethane (meth)acrylate (B) is preferably 1,000 to 8,000, more preferably 1,000 to 6,000, and still more preferably 1,000 to 5,000, from the viewpoint of the substrate followability, the adhesion, the car-wash scratching resistance, the hardness, and the weather resistance of the coating film to be obtained.

The weight average molecular weight of the urethane (meth)acrylate (B) can be measured by a method using gel permeation chromatography (GPC) described in a description field of the urethane (meth)acrylate (A).

The urethane (meth)acrylate (B) preferably has two or more polymerizable unsaturated groups, more preferably has 2 to 10 polymerizable unsaturated groups, and still more preferably has 2 to 6 polymerizable unsaturated groups in one molecule thereof, from the viewpoint of the substrate followability, the adhesion, the car-wash scratching resistance, the hardness, and the weather resistance of the coating film to be obtained.

An unsaturated group equivalent of the urethane (meth)acrylate (B) is preferably in a range of 250 g/mol to 5,000 g/mol, more preferably in a range of 300 g/mol to 3,000 g/mol, and still more preferably in a range of 350 g/mol to 1,500 g/mol, from the viewpoint of improving the hardness and the weather resistance of the coating film to be obtained.

In the present invention, a reason why the coating film having excellent substrate followability, adhesion, car-wash scratching resistance, hardness, and weather resistance can be obtained by containing the urethane (meth)acrylate (B) is considered to be that a strong cohesive force of non-covalent bonding based on a hydrogen bond is generated between the urethane (meth)acrylate (B) and the urethane (meth)acrylate (A) to form a coating film having an elastic recovery ability.

Examples of the urethane (meth)acrylate (B) include urethane (meth)acrylate (B1) obtained by reacting a polyisocyanate compound (b1) described later, a hydroxyl group-containing (meth)acrylate (b2) having a hydroxyl group and a (meth)acryloyl group in one molecule thereof, and, if necessary, a polyol compound (b3) and/or a chain extension component (b4) of the hydroxyl group-containing compound; and urethane (meth)acrylate (B2) obtained by reacting the polyol compound (b3), an isocyanate group-containing (meth)acrylate (b5) having an isocyanate group and a (meth)acryloyl group in one molecule thereof described later, and, if necessary, the polyisocyanate compound (b1) and/or the chain extension component (b4) of the hydroxyl group-containing compound.

Polyisocyanate Compound (b1)

The polyisocyanate compound (b1) is a compound having two or more isocyanate groups in one molecule thereof.

The polyisocyanate compound (b1) may be the same as the polyisocyanate compound (a2).

As the polyisocyanate compound (b1), an isocyanurate ring adduct of an aliphatic polyisocyanate compound, particularly an isocyanurate ring adduct of hexamethylene diisocyanate, can be suitably used from the viewpoint of the car-wash scratching resistance and the like.

Hydroxyl Group-Containing (meth)acrylate (b2)

The hydroxyl group-containing (meth)acrylate (b2) is a compound having a hydroxyl group and a (meth)acryloyl group in one molecule thereof.

Examples of the hydroxyl group-containing (meth)acrylate (b2) include monoester products of (meth)acrylic acid and dihydric alcohol having 2 to 8 carbon atoms, such as 2-hydroxyethyl (meth)acrylate, 2-hydroxypropyl (meth)acrylate, 3-hydroxypropyl (meth)acrylate, and 4-hydroxybutyl (meth)acrylate; ε-caprolactone-modified products of the monoester products of (meth)acrylic acid and dihydric alcohol having 2 to 8 carbon atoms; N-hydroxymethyl (meth)acrylamide; allyl alcohol; (meth) acrylates having a polyoxyalkylene chain whose molecular end is a hydroxyl group; di(meth)acrylate compounds such as glycerin di(meth)acrylate, trimethylolpropane di(meth)acrylate, and pentaerythritol di(meth)acrylate; and tri(meth)acrylate compounds such as pentaerythritol tri(meth)acrylate.

Polyol Compound (b3)

The polyol compound (b3) is a compound having two or more hydroxyl groups in one molecule thereof other than the hydroxyl group-containing (meth)acrylate (b2).

Examples of the polyol compound (b3) include: dihydric alcohols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 2-methyl-1,3-propanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecanedimethanol, hydroxypivalic acid neopentyl glycol ester, hydrogenated bisphenol A, hydrogenated bisphenol F, and dimethylolpropionic acid; polylactonediol obtained by adding a lactone compound such as ε-caprolactone to these dihydric alcohols; ester diol compounds such as bis(hydroxyethyl)terephthalate; polyether diol compounds such as an alkylene oxide adduct of bisphenol A, polyethylene glycol, polypropylene glycol, and polybutylene glycol; tri- or higher-hydric alcohols such as glycerin, trimethylolethane, trimethylolpropane, diglycerin, triglycerin, 1,2,6-hexanetriol, pentaerythritol, dipentaerythritol, tris(2-hydroxyethyl)isocyanuric acid, sorbitol, and mannitol; polylactone polyol compounds obtained by adding a lactone compound such as ε-caprolactone to these tri- or higher-hydric alcohols; and fatty acid esterified products of glycerin.

Chain Extension Component (b4) of Hydroxyl Group-Containing Compound

The chain extension component (b4) of the hydroxyl group-containing compound is a compound which can react with the hydroxyl group-containing compound such as the hydroxyl group-containing (meth)acrylate (b2) and the polyol compound (b3) to elongate a molecular chain.

Examples of the chain extension component (b4) of the hydroxyl group-containing compound include lactone compounds such as ε-caprolactone and γ-valerolactone; and alkylene oxide compounds such as ethylene oxide and propylene oxide.

Isocyanate Group-Containing (meth)acrylate (b5)

The isocyanate group-containing (meth)acrylate (b5) is a compound having an isocyanate group and a (meth)acryloyl group in one molecule thereof.

Examples of the isocyanate group-containing (meth)acrylate (b5) include isocyanate methyl (meth)acrylate, isocyanate ethyl (meth)acrylate, isocyanate propyl (meth)acrylate, isocyanate butyl (meth)acrylate, isocyanate octyl (meth)acrylate, p-methacryloxy-α,α'-dimethylbenzyl isocyanate, m-acryloxy-α,α'-dimethylbenzyl isocyanate, m- or p-isopropenyl-α,α'-dimethylbenzyl isocyanate, 1,1-bis((meth)acryloyloxymethyl)ethyl isocyanate, and a reaction product of 1 mol of hydroxyalkyl (meth)acrylate and 1 mol of diisocyanate compound, specific examples of which include a compound obtained by an equimolar addition reaction of a compound having two isocyanate groups having different reactivity such as isophorone diisocyanate with a hydroxyl group-containing polymerizable unsaturated monomer such as 2-hydroxyethyl (meth)acrylate and 4-hydroxybutyl (meth)acrylate.

Synthesis of Urethane (meth)acrylate (B)

Synthesis of Urethane (meth)acrylate (B1)

The urethane (meth)acrylate (B1) is obtained by subjecting the polyisocyanate compound (b1), the hydroxyl group-containing (meth)acrylate (b2), and, if necessary, the polyol compound (b3) and/or the chain extension component (b4) of the hydroxyl group-containing compound to a urethanation reaction.

A blending amount of the polyisocyanate compound (b1) is preferably 20 parts by mass to 70 parts by mass, and more preferably 30 parts by mass to 60 parts by mass with respect to 100 parts by mass of a total amount of the polyisocyanate compound (b1), the hydroxyl group-containing (meth)acrylate (b2), the polyol compound (b3), and the chain extension component (b4) of the hydroxyl group-containing compound.

A blending amount of the hydroxyl group-containing (meth)acrylate (b2) is preferably 10 parts by mass to 80 parts by mass, and more preferably 20 parts by mass to 60 parts by mass with respect to 100 parts by mass of the total amount of the polyisocyanate compound (b1), the hydroxyl group-containing (meth)acrylate (b2), the polyol compound (b3), and the chain extension component (b4) of the hydroxyl group-containing compound.

A blending amount of the polyol compound (b3) is preferably 0 to 60 parts by mass, and more preferably 0 to 50 parts by mass with respect to 100 parts by mass of the total amount of the polyisocyanate compound (b1), the hydroxyl group-containing (meth)acrylate (b2), the polyol compound (b3), and the chain extension component (b4) of the hydroxyl group-containing compound.

A blending amount of the chain extension component (b4) of the hydroxyl group-containing compound is preferably 0 to 50 parts by mass, and more preferably 0 to 30 parts by mass with respect to 100 parts by mass of the total amount of the polyisocyanate compound (b1), the hydroxyl group-containing (meth)acrylate (b2), the polyol compound (b3), and the chain extension component (b4) of the hydroxyl group-containing compound.

Synthesis of Urethane (meth)acrylate (B2)

The urethane (meth)acrylate (B2) is obtained by subjecting the polyol compound (b3), the isocyanate group-containing (meth)acrylate (b5), and, if necessary, the polyisocyanate compound (b1) and/or a chain extension component (b4) of the hydroxyl group-containing compound to a urethanation reaction.

A blending amount of the polyol compound (b3) is preferably 20 parts by mass to 80 parts by mass, and more preferably 30 parts by mass to 60 parts by mass with respect to 100 parts by mass of a total amount of the polyol compound (b3), the isocyanate group-containing (meth)acrylate (b5), the polyisocyanate compound (b1), and the chain extension component (b4) of the hydroxyl group-containing compound.

A blending amount of the isocyanate group-containing (meth)acrylate (b5) is preferably 10 parts by mass to 60 parts by mass, and more preferably 20 parts by mass to 50 parts by mass with respect to 100 parts by mass of the total amount of the polyol compound (b3), the isocyanate group-containing (meth)acrylate (b5), the polyisocyanate compound (b1), and the chain extension component (b4) of the hydroxyl group-containing compound.

A blending amount of the polyisocyanate compound (b1) is preferably 0 to 60 parts by mass, and more preferably 0 to 50 parts by mass with respect to 100 parts by mass of the total amount of the polyol compound (b3), the isocyanate group-containing (meth)acrylate (b5), the polyisocyanate compound (b1), and the chain extension component (b4) of the hydroxyl group-containing compound.

A blending amount of the chain extension component (b4) of the hydroxyl group-containing compound is preferably 0 to 40 parts by mass, and more preferably 0 to 30 parts by mass with respect to 100 parts by mass of the total amount of the polyol compound (b3), the isocyanate group-containing (meth)acrylate (b5), the polyisocyanate compound (b1), and the chain extension component (b4) of the hydroxyl group-containing compound.

The urethanization reaction can be performed in an organic solution. Examples of the organic solvent include aromatic hydrocarbon solvents such as toluene and xylene; ketone solvents such as acetone, methyl ethyl ketone, methyl isobutyl ketone, and cyclohexanone; and ester solvents such as ethyl acetate, propyl acetate, isobutyl acetate, and butyl acetate. These may be used alone or as a mixture of two or more thereof.

A reaction temperature is preferably room temperature to 100° C., and a reaction time is preferably 1 hour to 10 hours.

In the urethanization reaction, a progress state of the reaction can be confirmed by tracing an isocyanate equivalent of the reaction solution.

In the urethanization reaction, an organic tin catalyst such as dibutyltin dilaurate, dibutyltin diethylhexoate, and dibutyltin sulfite may be used as necessary. An amount of the catalyst is preferably 0.01 part by mass to 1.0 part by mass, and more preferably 0.1 part by mass to 0.5 part by mass, with respect to 100 parts by mass of a total amount of the reaction raw materials. A polymerization inhibitor such as hydroquinone monomethyl ether may also be used. When the polymerization inhibitor is used, an addition amount thereof is preferably 0.01 part by mass to 1.0 part by mass with respect to 100 parts by mass of the total amount of the reaction raw materials.

As the urethane (meth)acrylate (B), a commercially available product can also be used. Examples of the commercially available product include "Shikoh UV-7000B", "Shikoh UV-7510B", and "Shikoh UV-7550B" (all manufactured by Nippon Synthetic Chemical Industry Co., Ltd.), "EBECRYL 4666", "EBECRYL 8402", and "EBECRYL 8804" (all manufactured by Daicel-allnex Ltd.), "ARONIX OT-1005" (manufactured by Toagosei Co., Ltd.), "ETERCURE DR-U065B" (manufactured by Eternal materials co., Ltd.), and "ARTRESIN UN-952" (manufactured by Negami Chemical Industrial Co., Ltd.).

The urethane (meth)acrylate may be used alone or in combination of two or more thereof.

(C) Polymerizable Unsaturated Compound

The polymerizable unsaturated compound (C) is at least one compound selected from the group consisting of: a polymerizable unsaturated compound (c1) having three or more polymerizable unsaturated groups in one molecule thereof and having a weight average molecular weight in a range of 280 or more and less than 1,000; a polymerizable unsaturated compound (c2) having an alicyclic structure and one or two polymerizable unsaturated groups in one molecule thereof and having a weight average molecular weight in a range of 200 or more and less than 1,000; and a (meth)acrylamide compound (c3) having a weight average molecular weight in a range of 110 or more and less than 1,000.

Polymerizable Unsaturated Compound (c1)

The polymerizable unsaturated compound (c1) is a polymerizable unsaturated compound having three or more polymerizable unsaturated groups in one molecule thereof and having a weight average molecular weight in a range of 280 or more and less than 1,000.

When three or more polymerizable unsaturated groups are contained in one molecule, the coating film to be obtained is a coating film excellent in the hardness and the weather resistance. When the weight average molecular weight is 280 or more, the coating film to be obtained is a coating film having excellent adhesion. When the weight average molecular weight is less than 1000, the coating film to be obtained is a coating film having excellent hardness and weather resistance.

It is presumed that when the polymerizable unsaturated compound (c1) is contained, the crosslink density of the coating film to be obtained is improved, and the hardness and the weather resistance of the coating film are improved.

From the viewpoint of improving the hardness and the weather resistance of the coating film to be obtained, the polymerizable unsaturated compound (c1) more preferably has 3 to 10 polymerizable unsaturated groups, still more preferably 3 to 6 polymerizable unsaturated groups, and particularly preferably 3 polymerizable unsaturated groups, in one molecule thereof.

The polymerizable unsaturated compound (c1) preferably has the weight average molecular weight in a range of 290 or more and less than 800, more preferably in a range of 300 or more and less than 700, and still more preferably in a range of 400 or more and less than 600, from the viewpoint of improving the adhesion, the hardness, and the weather resistance of the coating film to be obtained.

An unsaturated group equivalent of the polymerizable unsaturated compound (c1) is preferably in a range of 80 g/mol to 250 g/mol, more preferably in a range of 85 g/mol to 225 g/mol, and still more preferably in a range of 100 g/mol to 200 g/mol, from the viewpoint of improving the adhesion, the hardness, and the weather resistance of the coating film to be obtained.

Examples of the polymerizable unsaturated compound (c1) include dipentaerythritol hexa(meth)acrylate, ditrimethylolpropane tetra(meth)acrylate, trimethylolpropane tri (meth)acrylate, tris((meth)acryloxyethyl)isocyanurate, pentaerythritol tetra(meth)acrylate, and alkylene oxide modified products, caprolactone modified products, and multimer mixtures thereof.

Among these, dipentaerythritol hexaacrylate, ditrimethylolpropane tetraacrylate, trimethylolpropane triacrylate, tris(acryloxyethyl)isocyanurate, and pentaerythritol tetraacrylate are preferable, from the viewpoint of improving the hardness and the weather resistance of the coating film to be obtained, and ditrimethylolpropane tetraacrylate and tris (acryloxyethyl)isocyanurate are more preferable, from the viewpoint of improving the adhesion of the coating film to be obtained.

Polymerizable Unsaturated Compound (c2)

The polymerizable unsaturated compound (c2) is a polymerizable unsaturated compound having an alicyclic structure and one or two polymerizable unsaturated groups in one molecule thereof and having a weight average molecular weight in a range of 200 or more and less than 1,000.

When an alicyclic structure is contained in one molecule, the coating film to be obtained is a coating film excellent in coating film hardness and weather resistance. When a weight average molecular weight is 200 or more, the coating film to be obtained is a coating film having excellent coating film hardness and weather resistance. When the weight average molecular weight is less than 1,000, the coating film to be obtained is a coating film having excellent adhesion, coating film hardness, and weather resistance.

When the polymerizable unsaturated compound (c2) is contained, it is considered that the coating film hardness of the coating film obtained by the alicyclic structure in the polymerizable unsaturated compound (c2) is improved, and the weather resistance of the coating film is improved.

The polymerizable unsaturated compound (c2) more preferably has two or more alicyclic structures in one molecule thereof from the viewpoint of improving the hardness and the weather resistance of the coating film to be obtained.

Examples of the polymerizable unsaturated compound (c2) having two or more alicyclic structures in one molecule thereof include tricyclodecane dimethanol di(meth)acrylate, dicyclopentanyl (meth)acrylate, and isobornyl (meth)acrylate, preferably tricyclodecane dimethanol diacrylate, dicyclopentanyl acrylate, and isobornyl acrylate.

The polymerizable unsaturated compound (c2) preferably has two polymerizable unsaturated groups in one molecule thereof from the viewpoint of improving the car-wash scratching resistance, the coating film hardness, and the weather resistance of the coating film to be obtained. As the polymerizable unsaturated compound (c2) having two polymerizable unsaturated groups in one molecule thereof, for example, tricyclodecane dimethanol di(meth)acrylate, 1,4-cyclohexanedimethanol di(meth)acrylate, preferably tricyclodecane dimethanol diacrylate, and 1,4-cyclohexanedimethanol diacrylate can be suitably used.

The polymerizable unsaturated compound (c2) preferably has a weight average molecular weight in a range of 250 or more and less than 700, and more preferably in a range of 300 or more and less than 500, from the viewpoint of improving the hardness and the weather resistance of the coating film to be obtained.

An unsaturated group equivalent of the polymerizable unsaturated compound (c2) is preferably in a range of 100 g/mol to 1,000 g/mol, more preferably in a range of 125 g/mol to 350 g/mol, and still more preferably in a range of 150 g/mol to 250 g/mol, from the viewpoint of improving the hardness and the weather resistance of the coating film to be obtained.

Examples of the polymerizable unsaturated compound (c2) other than the specific examples described above include isobornyl (meth)acrylate and 4-tert-butylcyclohexyl (meth)acrylate.

Among the polymerizable unsaturated compounds (c2), tricyclodecane dimethanol di(meth)acrylate is particularly preferable from the viewpoint of improving the hardness and the weather resistance of the coating film to be obtained.

(Meth)acrylamide Compound (c3)

The (meth)acrylamide compound (c3) is a (meth)acrylamide compound having a weight average molecular weight in a range of 110 or more and less than 1,000.

When the weight average molecular weight is 110 or more, the coating film to be obtained is a coating film having excellent substrate followability. When the weight average molecular weight is less than 1,000, the coating film to be obtained is a coating film having the excellent adhesion, hardness, and weather resistance.

It is considered that, when the (meth)acrylamide compound (c3) is contained, a tough crosslinked structure is formed as a hydrogen-bonding component together with urethane (meth)acrylate. Since the (meth)acrylamide compound (c3) is a low molecular weight component as well, it is considered that the (meth)acrylamide compound (c3) erodes a surface of a plastic material and exhibits strong adhesion based on an anchoring effect. Therefore, it is considered that the substrate followability derived from an acrylamide structure is improved, and the adhesion and the coating film hardness are improved.

A weight average molecular weight of the (meth)acrylamide compound (c3) is preferably in a range of 120 or more and less than 500, and more preferably in a range of 140 or more and less than 300, from the viewpoint of improving the adhesion and the coating film hardness of the coating film to be obtained.

Examples of the (meth)acrylamide compound (c3) include 2-hydroxyethyl(meth)acrylamide and (meth)acryloyl morpholine.

Among these, as the (meth)acrylamide compound (c3), a (meth)acrylamide compound (c3) containing no hydroxyl group can be suitably used from the viewpoint of ing film to be obtained. As the (meth)acrylamide compound (c3) containing no hydroxyl group, for example, (meth)acryloyl morpholine, preferably acryloyl morpholine can be used.

The polymerizable unsaturated compound (C) preferably contains the (meth)acrylamide compound (c3) and at least one of the polymerizable unsaturated compound (c1) and the polymerizable unsaturated compound (c2), from the viewpoint of improving the substrate followability, the adhesion, the hardness, and the weather resistance of the coating film to be obtained.

The reason for this is considered to be that the polymerizable unsaturated compound (c1) and the polymerizable unsaturated compound (c2) have a large effect of improving the hardness and the weather resistance of the coating film to be obtained, and the (meth)acrylamide compound (c3) has a large effect of improving the substrate followability and the adhesion of the coating film to be obtained. In particular, the polymerizable unsaturated compound (C) more preferably contains the polymerizable unsaturated compound (c2) and the (meth)acrylamide compound (c3), from the viewpoint of improving the substrate followability, the adhesion, the hardness, and the weather resistance of the coating film to be obtained.

(D) Photopolymerization Initiator

The photopolymerization initiator (D) is a compound that absorbs active energy rays and generates free radicals, or a mixture of these compounds. The photopolymerization initiator (D) may be a compound that can generate free radicals in a form of an intermediate.

Examples of the photopolymerization initiator (D) include a compound that can be photochemically activated (for example, benzoin); a combination of a chromophore and a coinitiator (for example, benzophenone and tertiary amine) and a mixture thereof; a combination of a sensitizer and a coinitiator (for example, thioxanthone and tertiary amine) or a combination of a sensitizer and a chromophore (for example, thioxanthone and aminoketone); and a redox system such as a combination of $H_2O_2$ and an iron (II) salt; and an electron transport pair such as a dye and a borate and/or an amine.

Examples of the photopolymerization initiator (D) include α-diketone compounds such as benzyl and diacetyl; acyloin compounds such as benzoin; acyloin ether compounds such as benzoin methyl ether, benzoin ethyl ether and benzoin isopropyl ether; thioxanthone compounds such as thioxanthone, 2,4-diethylthioxanthone, 2-isopropylthioxanthone and thioxanthone-4-sulfonic acid; benzophenone compounds such as benzophenone, o-methylbenzoyl benzoate, 4-methylbenzophenone, 4-phenylbenzophenone, 4,4'-bis(dimethylamino)benzophenone and 4,4'-bis(diethylamino)benzophenone; Michler ketone compounds; acetophenone compounds such as acetophenone, 2-(4-toluenesulfonyloxy)-2-phenylacetophenone, p-dimethylaminoacetophenone, α,α'-dimethoxyacetoxybenzophenone, 2,2'-dimethoxy-2-phenylacetophenone, p-methoxyacetophenone, 2-methyl-[4-(methylthio)phenyl]-2-morpholino-1-propanone, 2-benzyl-2-dimethylamino-1-(4-morpholinophenyl)-butan-1-one, α-isohydroxyisobutylphenone, α,α'-dichloro-4-phenoxyacetophenone and 1-hydroxy-cyclohexyl phenyl ketone; acylphosphine oxide compounds such as 2,4,6-trimethylbenzoyldiphenylphosphine oxide and bis(acyl)phosphine oxide; halogen compounds such as anthraquinone and 1,4-naphthoquinone; halogen compounds such as phenacyl chloride, trihalomethylphenyl sulfone, tris(trihalomethyl)-s-triazine; peroxides such as di-tert-butyl peroxide.

Examples of commercially available products of the photopolymerization initiator (D) include OMNIRAD-127, OMNIRAD-184, OMNIRAD MBF, OMNIRAD-BP Flakes, OMNIRAD-500, OMNIRAD-369, OMNIRAD-651, OMNIRAD-754, OMNIRAD-819, OMNIRAD-907, OMNIRAD-2959, OMNIRAD-TPO H and OMNIRAD-1173 (trade names, all manufactured by IGM resins); KAYACURE-MBP, KAYACURE-DETX-S, KAYACURE-DMBI, KAYACURE-EPA and KAYACURE-OA (trade names, all manufactured by Nippon Kayaku Co., Ltd.); VICURE-10 and VICURE-55 (trade names, all manufactured by STAUFFER Co., Ltd.); Trigonal P1 (trade name, manufactured by AKZO Co., Ltd.); SANDORAY 1000 (trade name, manufactured by SANDOZ Co., LTD); DEAP (trade name, manufactured by APJOHN Co., Ltd.); QUANTACURE-PDO, QUANTACURE-ITX, and QUANTACURE-EPD (trade names, all manufactured by WARD BLEKINSOP Co., Ltd.), ESACURE KIP 150, and ESACURE ONE (trade names, manufactured by LAMBERTI).

The photopolymerization initiator (D) may be used alone or in combination of two or more thereof.

Ultraviolet Absorber and Light Stabilizer

The active energy ray-curable coating composition according to the present invention preferably further contains at least one of an ultraviolet absorber and a light stabilizer.

Ultraviolet Absorber

As the ultraviolet absorber, known ultraviolet absorbers of related art can be used, and examples thereof include a benzotriazole-based absorber, a triazine-based absorber, a salicylic acid derivative-based absorber, and a benzophenone-based absorber. The ultraviolet absorber may have a polymerizable unsaturated group.

Specific examples of the benzotriazole-based absorber include 2-(2'-hydroxy-5'-methylphenyl)benzotriazole, 2-(2'-hydroxy-5'-tert-butylphenyl)benzotriazole, 2-(2'-hydroxy-3',5'-di-tert-butylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5 -chlorobenzotriazole, 2-(2'-hydroxy-3',5'-di-t-amylphenyl)benzotriazole, 2-(2'-hydroxy-4'-octoxyphenyl)benzotriazole, 2-{2'-hydroxy-3'-(3",4",5",6"-tetrahydrophthalic imidomethyl)-5'-methylphenyl}benzotriazole, and 2-[2-hydroxy-5-[2-(methacryloyloxy)ethyl]phenyl]-2H-benzotriazole.

Specific examples of the triazine-based absorber include 2,4-bis(2,4-dimethylphenyl)-6-(2-hydroxy-4-isooctyloxyphenyl)-1,3,5-triazine, 2[4((2-hydroxy-3-dodecyloxypropyl)-oxy)-2-hydroxyphenyl]-4,6-bis(2,4-dimethylphenyl)-1,3,5-triazine, 2[4-((2-hydroxy-3-tridecyloxypropyl)-oxy)-2-hydroxyphenyl]-4,6-bis(2,4-dimethylphenyl)-1,3,5-triazine, and 2-(2,4-dihydroxyphenyl)-4,6-bis(2,4-dimethylphenyl)-1,3,5-triazine.

Specific examples of the salicylic acid derivative-based absorber include phenyl salicylate, p-octylphenyl salicylate, and 4-tert-butylphenyl salicylate.

Specific examples of the benzophenone-based absorber include 4-dihydroxybenzophenone, 2-hydroxy-4-methoxybenzophenone, 2,2'-dihydroxy-4-methoxybenzophenone, 2-hydroxy-4-methoxy-2'-carboxybenzophenone, 2-hydroxy-4-methoxy-5-sulfobenzophenone trihydrate, 2,2'-dihydroxy-4,4'-dimethoxybenzophenone, 2-hydroxy-4-octoxybenzophenone, 2-hydroxy-4-octadecyloxybenzophenone, sodium 2,2'-dihydroxy-4,4'-dimethoxy-5-sulfobenzophenone, 2,2',4,4'-tetrahydroxybenzophenone, 4-dodecyloxy-2-hydroxybenzophenone, 5-chloro-2-hydroxybenzophenone, resorcinol monobenzoate, 2,4-dibenzoylresorcinol, 4,6-dibenzoylresorcinol, hydroxy dodecylbenzophenone, and 2,2'-dihydroxy-4(3-methacryloxy-2-hydroxypropoxy) benzophenone.

Examples of commercially available products of the ultraviolet absorber include TINUVIN 900, TINUVIN 928, TINUVIN 384-2, TINUVIN 479, TINUVIN 405, TINUVIN 400 (trade names, manufactured by BASF, TINUVIN is a registered trademark), and RUVA-93 (trade name, manufactured by Otsuka Chemical Co., Ltd.).

When the active energy ray-curable coating composition according to the present invention contains the ultraviolet absorber, a blending amount of the ultraviolet absorber is usually in a range of 0.5% by mass to 10% by mass, preferably 0.8% by mass to 9 mass %, more preferably 1.0% by mass to 8 mass %, with respect to a total solid content of the active energy ray-curable coating composition.

In the present specification, the term "solid content" refers to a non-volatile component such as a resin, an additive, or a pigment contained in the composition, which remains after drying at 110° C. for 1 hour. Therefore, for example, the total solid content of the active energy ray-curable coating composition according to the present invention can be calculated by weighing the active energy ray-curable coating composition in a heat-resistant container such as an aluminum foil cup, spreading the active energy ray-curable coating composition on a bottom surface of the container, drying the composition at 110° C. for 1 hour, weighing the mass of the components in the active energy ray-curable coating composition remaining after drying, and determining a ratio of the mass of the components remaining after drying to the total mass of the active energy ray-curable coating composition before drying.

Light Stabilizer

The light stabilizer is used as a radical chain inhibitor for capturing active radical species generated in the process of deterioration of the coating film, and examples thereof include a light stabilizer of a hindered amine compound.

Among the light stabilizers, a hindered piperidine compound is an example of a light stabilizer exhibiting an excellent light stabilizing effect.

Examples of the hindered piperidine compound include monomeric compounds such as bis(1,2,2,6, 6-pentamethyl-4-piperidyl)sebacate, bis(2,2,6,6-tetramethyl-4-piperidyl) sebacate, bis (N-methyl-2,2,6,6-tetramethyl-4-piperidyl)sebacate, 4-benzoyloxy-2,2',6,6'-tetramethylpiperidine, and bis(1,2,2,6,6-pentamethyl-4-piperidyl){[3,5-bis(1,1-dimethylethyl)-4-hydroxyphenyl]methyl} butylmalonate; oligomeric compounds such as poly {[6-(1,1,3,3-tetramethylbutyl)imino-1,3,5-triazine-2,4-diyl][(2,2,6,6-tetramethyl-4-piperidyl) imino]hexamethylene [(2,2,6,6-tetramethyl-4-piperidyl) iminol]}; and polyester bonding compounds such as polyester compounds of 4-hydroxy-2,2,6,6-tetramethyl-1-piperidine ethanol and succinic acid, but the hindered piperidine compound is not limited thereto. As the light stabilizer, a known polymerizable light stabilizer can also be used.

Examples of commercially available products of the light stabilizer include TINUVIN 123, TINUVIN 152, and TINUVIN 292 (trade names, manufactured by BASF, TINUVIN is a registered trademark), HOSTAVIN 3058 (trade name, manufactured by Clariant, Hostavin is a registered trademark), and ADKSTAB LA-82 (trade name, manufactured by ADEKA Corporation, ADKSTAB is a registered trademark).

When the active energy ray-curable coating composition according to the present invention contains the light stabilizer, a blending amount of the light stabilizer is preferably in a range of 0.5% by mass to 10% by mass, preferably 0.8% by mass to 9% by mass, and more preferably 1.0% by mass to 8% by mass with respect to the total solid content of the active energy ray-curable coating composition.

Other Components

The active energy ray-curable coating composition according to the present invention may further contain other polymerizable unsaturated compounds.

As other polymerizable unsaturated compounds, a compound having one polymerizable unsaturated group in one molecule thereof can be suitably used.

Examples of other polymerizable unsaturated compounds include an esterified product of monohydric alcohol and (meth)acrylic acid, hydroxyl group-containing (meth)acrylate, glycidyl group-containing (meth)acrylate, carboxyl group-containing (meth)acrylate, a vinyl aromatic compound, nitrogen-containing alkyl (meth)acrylate, a polymerizable amide compound, and a hydrolyzable silane compound having a polymerizable unsaturated group.

Examples of the esterified product of monohydric alcohol and (meth)acrylic acid include methyl (meth)acrylate, ethyl (meth)acrylate, n-propyl (meth)acrylate, isopropyl (meth) acrylate, n-butyl (meth)acrylate, isobutyl (meth)acrylate, tert-butyl (meth)acrylate, neopentyl (meth)acrylate, cyclohexyl (meth)acrylate, tetrahydrofurfuryl (meth)acrylate, isobornyl (meth)acrylate, phenyl (meth)acrylate, benzyl (meth)acrylate, and N-acryloyloxyethyl hexahydrophthalimide.

Examples of the hydroxyl group-containing (meth)acrylate include hydroxyethyl (meth)acrylate, hydroxypropyl (meth)acrylate, and hydroxybutyl (meth)acrylate.

Examples of the glycidyl group-containing (meth)acrylate include glycidyl (meth)acrylate and allyl glycidyl ether.

Examples of the carboxyl group-containing (meth)acrylate include acrylic acid, methacrylic acid, crotonic acid, itaconic acid, maleic acid, fumaric acid, 2-carboxyethyl (meth)acrylate, 2-carboxypropyl (meth)acrylate, and 5-carboxypentyl (meth)acrylate.

Examples of the vinyl aromatic compound include styrene, α-methylstyrene, vinyltoluene, and α-chlorostyrene.

Examples of the nitrogen-containing alkyl (meth)acrylate include N,N-dimethylaminoethyl (meth)acrylate, N,N-diethylaminoethyl (meth)acrylate, and N-tert-butylaminoethyl (meth)acrylate.

Examples of the polymerizable amide compound include acrylamide, methacrylamide, N-methyl(meth)acrylamide, N-ethylacrylamide, and N,N-dimethyl(meth)acrylamide.

Examples of the hydrolyzable silane compound having a polymerizable unsaturated group include 3-(meth)acryloyloxypropyltrimethoxysilane, 2-(meth)acryloyloxyethyltrimethoxysilane, 3-(meth)acryloyloxypropyltriethoxysilane, 2-(meth)acryloyloxyethyltriethoxysilane, and 3-(meth) acryloyloxypropylmethyldimethoxysilane.

The active energy ray-curable coating composition according to the present invention may further contain, as necessary, other additive components generally used in the field of painting, such as a solvent, a pigment, a catalyst, an antioxidant, a surface conditioner, an antifoaming agent, an emulsifier, a surfactant, an antifouling agent, a wetting agent, a thickener, a dye, a scratching resistance improver, and a gloss conditioner.

As the solvent, for example, an organic solvent, water can be used. Examples of the organic solvent include ketones such as acetone, methyl ethyl ketone, and methyl isobutyl ketone; esters such as ethyl acetate, butyl acetate, isobutyl acetate, methyl benzoate, ethyl ethoxypropionate, ethyl propionate, and methyl propionate; ethers such as tetrahydrofuran, dioxane, and dimethoxyethane; glycol ethers such as ethylene glycol monomethyl ether, ethylene glycol monoethyl ether, diethylene glycol monomethyl ether, propylene glycol monomethyl ether acetate, and 3-methoxybutyl acetate; aromatic hydrocarbons; and aliphatic hydrocarbons.

The active energy ray-curable coating composition according to the present invention may be either an organic solvent-based coating composition or a water-based coating composition, but from the viewpoint of the storage stability of the coating material, the active energy ray-curable coating composition is preferably an organic solvent-based coating composition. In the present specification, the water-based coating composition is a coating material in which a main component of the solvent is water, and the organic solvent-based coating composition is a coating material that does not contain water as a solvent substantially.

Examples of the pigment include a brilliant pigment, a coloring pigment, and an extender pigment. The pigment can be used alone or in combination of two or more.

Examples of the brilliant pigment include aluminum (including vapor-deposited aluminum), copper, zinc, brass, nickel, glass flakes, aluminum oxide, mica, aluminum oxide coated with titanium oxide and/or iron oxide, and mica coated with titanium oxide and/or iron oxide.

Examples of the coloring pigment include titanium oxide, zinc oxide, carbon black, molybdenum red, Prussian blue, cobalt blue, azo pigments, phthalocyanine pigments, quinacridone pigments, isoindoline pigments, threne pigments, perylene pigments, dioxazine pigments, and diketopyrrolopyrrole pigments.

Examples of the extender pigment include clay, kaolin, barium sulfate, barium carbonate, calcium carbonate, talc, silica, and alumina white.

Method for Producing Active Energy Ray-Curable Coating Composition

The active energy ray-curable coating composition according to the present invention can be prepared, for example, by mixing the components described above in a solvent and dissolving or dispersing the components.

A mixing ratio of the components (A), (B), (C), and (D) in the active energy ray-curable coating composition according to the present invention is preferably within the following range with respect to the total solid content of the components (A), (B), and (C), from the viewpoint of the substrate followability, the adhesion, the car-wash scratching resistance, the hardness, and the weather resistance of the coating film to be formed.

Component (A): 10% by mass to 40% by mass, preferably 15% by mass to 35% by mass, and more preferably 20% by mass to 30% by mass Component (B): 25% by mass to 70% by mass, preferably 30% by mass to 60% by mass, and more preferably 40% by mass to 50% by mass Component (C): 20% by mass to 50% by mass, preferably 25% by mass to 45% by mass, and more preferably 30% by mass to 40% by mass Component (D): 3.0% by mass to 7.0% by mass, preferably 3.5% by mass to 6.5% by mass, and more preferably 4.0% by mass to 6.0% by mass The reason why the coating film having the excellent substrate followability, adhesion, car-wash scratching resistance, hardness, and weather resistance can be formed by use of the active energy ray-curable coating composition according to the present invention is presumed as follows.

That is, since the urethane (meth)acrylate (A) has a polycarbonate polyurethane skeleton having a relatively long chain (average molecular weight in a range of 10,000 or more and 40,000 or less) and a relatively large number (three or more) of polymerizable unsaturated groups, the polymerizable unsaturated groups react with the urethane (meth)acrylate (B) and/or the polymerizable unsaturated groups in the polymerizable unsaturated compound (C).

Then, a crosslinked coating film is formed in which the polycarbonate polyurethane skeleton having a relatively long chain is bonded via the urethane (meth)acrylate (B) and/or the polymerizable unsaturated compound (C). At this time, the urethane (meth)acrylate (A) having a large molecular weight between crosslinks (Mc) functions as a flexible component, the urethane (meth)acrylate (B) having Mc which is larger than Mc of the component (C) and less than Mc of the component (A) functions as a physical property-adjusting component, and the polymerizable unsaturated compound (C) having a small Mc functions as a hardness-imparting component. As a result, since the crosslinked coating film has appropriate flexibility and hardness, it is possible to obtain a coating film excellent in the substrate followability, the adhesion, the car-wash scratching resistance, hardness, and the weather resistance. As Mc is decreased, the hardness of the coating film is increased.

Cured Coating Film

A cured coating film according to the present invention can be obtained by curing the active energy ray-curable coating composition according to the present invention.

The active energy ray-curable coating composition according to the present invention can be cured by coating the coating composition to an object to be coated to form an uncured coating film, and then irradiating the uncured coating film with an active energy ray.

A molecular weight between crosslinks of the cured coating film according to the present invention is in a range of 200 g/mol to 900 g/mol, preferably in a range of 220 g/mol to 800 g/mol, and more preferably in a range of 240 g/mol to 700 g/mol.

This is because when the molecular weight between crosslinks is 200 g/mol or more, the coating film to be obtained is a coating film having the excellent substrate followability, and when the molecular weight between crosslinks is 900 g/mol or less, the coating film to be obtained is a coating film having the excellent hardness and weather resistance.

In the present invention, the molecular weight between crosslinks of the cured coating film is a theoretical calculation value obtained by applying the minimum value of the storage elastic modulus to the following rubber viscoelastic theoretical formula 1 in dynamic viscoelasticity measurement in which a tan δ value is measured under conditions of a frequency of 11 Hz, a temperature rise rate of 3° C./min, and a temperature range of 30° C. to 200° C. using an FT rheology spectrometer "Rheogel E-4000" (manufactured by UBM Co., Ltd.) for a sample.

Formula 1: $Mc = 3 \rho RT/E_{min}$

Mc: molecular weight between crosslinks (g/mol)
ρ: density (g/cm$^3$) of sample coating film
R: gas constant (8.314 J/K/mol)
T: absolute temperature (K) when storage elastic modulus is Emin
Emin: minimum value (MPa) of storage elastic modulus The sample is prepared as follows. First, the active energy ray-curable coating composition according to the present invention is applied onto a polypropylene plate so as to have a cured film thickness of 30 μm±5 μm, allowed to stand for 1 minute, and then heated at 80° C. for 3 minutes to volatilize the solvent in the active energy ray-curable coating composition. Next, a cured coating film is formed by performing UV irradiation using a metal halide lamp under irradiation conditions of 400 mW/cm$^2$ and 1500 mJ/cm$^2$ (when an ultraviolet integrated photometer UIT-250, manufactured by Ushio Inc., and a light receiving unit UVD-C365 are used). Thereafter, the cured coating film is cut into a rectangular shape having a length of 20 mm and a width of 5 mm, and the rectangular-shaped coating film obtained by peeling from the polypropylene plate is used as a sample.

The molecular weight between crosslinks of the cured coating film can be adjusted, for example, by adjusting the unsaturated group equivalents of the component (A), the component (B), and the component (C), adjusting the blending ratio, and the like.

The cured coating film obtained by applying the active energy ray-curable coating composition has a glass transition temperature in a range of 40° C. to 90° C., preferably 50° C. to 85° C., and more preferably 55° C. to 80° C.

This is because when the glass transition temperature of the cured coating film is 40° C. or higher, the coating film to be obtained is a coating film having the excellent hardness and weather resistance, and when the glass transition temperature is 90° C. or lower, the coating film to be obtained is a coating film having the excellent substrate followability.

In the present invention, the glass transition temperature of the cured coating film is a dynamic glass transition temperature measured as a temperature showing a maximum value of tan δ (loss elastic modulus/storage elastic modulus) in dynamic viscoelasticity measurement in the measurement of molecular weight between crosslinks.

The glass transition temperature of the cured coating film can be adjusted, for example, by adjusting the glass transition temperatures of the component (A), the component (B), and the component (C), adjusting the mixing ratios of the components (A), (B), and (C), and the like.

Coated Article and Method for Forming Coating Film

A coated article having a cured coating film on an object to be coated can be obtained by applying the active energy ray-curable coating composition according to the present invention on the object to be coated to form an uncured coating film, and then irradiating the uncured coating film with an active energy ray to cure the uncured coating film. The present invention also relates to such a coated article and a method for forming a coating film.

Object to be Coated

A material of the object to be coated is not particularly limited, and may be an inorganic material, an organic material, or a hybrid material of an organic material and an inorganic material.

Examples of the inorganic material include metal materials such as iron, aluminum, brass, copper, tin, stainless steel, zinc plated steel, and zinc alloy (Zn—Al, Zn—Ni, Zn—Fe, and the like) plated steel; glass; cement; and concrete.

Examples of the organic material include acrylic resins such as polymethyl methacrylate, polyester resins such as polyethylene terephthalate, polyethylene naphthalate, poly-1,4-cyclohexanedimethylene terephthalate, polyethylene-1,2-diphenoxyethane-4,4'-dicarboxylate, and polybutylene terephthalate, epoxy resins represented by commercially available products such as Epicoat (trade name, manufactured by Yuka Shell Epoxy Co., Ltd.), polycarbonate resins, polyimide resins, novolak resins, phenol resins, acrylonitrile-butadiene-styrene (ABS) resins, acrylonitrile-ethylene-styrene (AES) resins, acrylonitrile-styrene-acrylate (ASA) resins, vinylidene chloride resins, polyurethane resins, cellulose esters (for example, triacetyl cellulose, diacetyl cellulose, propionyl cellulose, butyryl cellulose, acetyl propionyl cellulose, and nitrocellulose), polyamides, polystyrene (for example, syndiotactic polystyrene), polyolefins (for example, polypropylene, polyethylene, and polymethylpentene), polysulfone, polyethersulfone, polyarylate, polyetherimide, polyetherketone, and various fiber reinforced plastic materials (fiber reinforced plastics: hereinafter, referred to as FRP materials or simply FRP).

The object to be coated may be, for example, an object in which a primer coating material, a cationic electrodeposition coating material, an intermediate coating material, an overcoat coating material, or the like is coated on a material such as the inorganic material, the organic material, or the hybrid material of an organic material and an inorganic material, and a primer layer, an electrodeposition coating film layer, an intermediate coating layer, an overcoat layer, or the like is formed in advance.

An application of the object to be coated with the active energy ray-curable coating composition according to the present invention is not particularly limited, and examples thereof include an outer plate portion of a body of an automobile such as a passenger car, a truck, a motorcycle, and a bus; an automobile exterior part such as a bumper, a center pillar, a mirror, and a door handle; an automobile interior part such as an instrument panel, a door trim, and a center console; and an outer plate portion of a household electric product such as a mobile phone and an audio device.

In particular, the coating film obtained by the active energy ray-curable coating composition according to the present invention is excellent in the substrate followability, the adhesion, the car-wash scratching resistance, the hardness, and the weather resistance, and thus can be suitably used in applications of automotive exterior parts.

Coating Step

A method for applying the active energy ray-curable coating composition according to the present invention is not particularly limited. For example, coating can be performed by air spraying, airless spraying, a rotary atomization coating machine, dip coating, a brush, or the like. At the time of coating, electrostatic application may be performed. A thickness of the coating film can be usually in a range of 10 μm to 100 μm, preferably in a range of 15 μm to 75 μm, and more preferably in a range of 20 μm to 50 μm in terms of a cured film thickness.

In a method for forming a coating film according to the present invention, it is preferable that the active energy ray-curable coating composition is applied on an object to be coated, allowed to stand and/or preheated, the solid content of the coating film to be obtained is adjusted to 95% by mass or more, and then the coating film is irradiated with an active energy ray.

Active Energy Ray Irradiation

The coating film applied to the object to be coated can be polymerized by irradiation with an active energy ray to form a cured coating film.

As the active energy ray to be radiated, a known active energy ray can be used. Specific examples thereof include ultraviolet light, visible light, laser light (near infrared laser, visible laser, ultraviolet laser, or the like), microwaves, electron beams, electromagnetic waves.

Among these active energy rays, ultraviolet rays can be suitably used from the viewpoint of economic efficiency.

Irradiation with an active energy ray can be performed using any light source that emits an electromagnetic wave having a wavelength that can be absorbed by the photopolymerization initiator (D) present in the active energy ray-curable coating composition. Such a light source usually emits an electromagnetic wave having a wavelength in a range of 200 nm to 2,000 nm.

As an irradiation source of the active energy ray, a known source can be used. Specifically, an ultra-high pressure mercury lamp, a high pressure mercury lamp, a medium pressure mercury lamp, a low pressure mercury lamp, an electrodeless lamp, a chemical lamp, a carbon arc lamp, a xenon lamp, a metal halide lamp, a fluorescent lamp, a tungsten lamp, a light emitting diode (LED), sunlight, or the like can be used. A pulse emission type active energy ray irradiation device can also be used.

The irradiation of the active energy ray may be performed over an entire region and/or a part thereof, for example, via a mask, or may be performed using a laser beam. It is also possible to cure the coating film only in a specific region by this method.

An irradiation amount of the active energy ray may be in a range in which polymerization of the active energy ray-curable coating composition can be performed, and is preferably in a range of 50 mJ/cm$^2$ to 3,000 mJ/cm$^2$ in the case of the high-pressure mercury lamp, 100 mJ/cm$^2$ to 5,000 mJ/cm$^2$ in the case of the metal halide lamp, particularly preferably 100 mJ/cm$^2$ to 1,500 mJ/cm$^2$ in the case of the high-pressure mercury lamp, and 500 mJ/cm$^2$ to 2,500 mJ/cm$^2$ in the case of the metal halide lamp.

The irradiation with the active energy ray can be performed in air or under an inert gas. As the inert gas, nitrogen gas, carbon dioxide, argon, helium, or a mixture thereof can be used.

In addition, heating may be performed together with curing by an active energy ray. As a heating method, hot air, hot gas, an infrared heater, an IR radiator, an oven, a heat roller, or the like can be used.

When heating is performed, heating conditions are determined from the viewpoint of productivity, workability, thermal stability of a substrate, and the like, and a heating temperature is preferably in a range of 30° C. to 120° C., particularly preferably in a range of 50° C. to 90° C., and a heating time is preferably in a range of 1 minute to 60 minutes, particularly preferably in a range of 1 minute to 20 minutes.

When the heating is performed, order of the active energy ray irradiation and the heating is not particularly limited, and the heating may be performed after the active energy ray irradiation, the active energy ray irradiation may be performed after the heating, or the active energy ray irradiation and the heating may be performed at the same time.

When the active energy ray irradiation and the heating are performed at the same time, heat from an irradiation source of the active energy ray (for example, heat generated by a lamp) may be used as a heat source. Furthermore, when the active energy ray irradiation is performed after the heating, the active energy ray irradiation may be performed in a state where a film forming substrate is hot (in a state where the film forming substrate has residual heat).

The active energy ray-curable coating composition according to the present invention is preferably used as a coating material to be applied on the uppermost layer since the coating film having excellent coating film hardness can be formed.

EXAMPLE

The present invention will be specifically described by way of the following examples, but the present invention is not limited thereto. In the examples, "part" and "%" mean mass-based, unless otherwise specified.

Components used in each example are as follows.

Urethane (meth)acrylate (A)

As the urethane (meth)acrylate (A) having a polycarbonate skeleton and three or more polymerizable unsaturated groups in one molecule thereof and having a weight average molecular weight in a range of 10,000 to 40,000, the following products were used.

"Urethane acrylate UA0581B" (manufactured by Ube Industries, Ltd.)

Urethane acrylate, which is a reaction product of the polycarbonate diol (a1) (manufactured by Ube Industries Ltd.), the polyisocyanate compound (a2), and the polymerizable unsaturated compound (a3) having a hydroxyl group Weight average molecular weight: 10,800

Number of polymerizable unsaturated functional groups per molecule: 6

Content of alicyclic structure in urethane (meth)acrylate (A): 16.6% by mass based on mass of urethane (meth)acrylate (A)

Content of alicyclic structure in polycarbonate diol (a1): 8.8% by mass based on mass of urethane (meth)acrylate (A)

B-type viscosity when diluted with butyl acetate to solid content of 50% by mass under conditions of 25° C. and 6 rpm: 830 mPa·s Using alicyclic diisocyanate as polyisocyanate compound (a2)

Using pentaerythritol triacrylate as polymerizable unsaturated compound (a3)

It is noted that pentaerythritol triacrylate comes under the polymerizable unsaturated compound (a3") having one hydroxyl group and two or more polymerizable unsaturated groups in one molecule thereof.

"UA0499B" (manufactured by Ube Industries Ltd.)

Urethane acrylate, which is a reaction product of the polycarbonate diol (a1) (manufactured by Ube Industries Ltd.), the polyisocyanate compound (a2), and the polymerizable unsaturated compound (a3) having a hydroxyl group Weight average molecular weight: 14,100

Number of polymerizable unsaturated functional groups per molecule: 6

Content of alicyclic structure in urethane (meth)acrylate (A): 18.0% by mass based on mass of urethane (meth)acrylate (A)

Content of alicyclic structure in polycarbonate diol (a1): 10.2% by mass based on mass of urethane (meth)acrylate (A)

B-type viscosity when diluted with butyl acetate to solid content of 50% by mass under conditions of 25° C. and 6 rpm: 2,770 mPa·s Using alicyclic diisocyanate as polyisocyanate compound (a2)

Using pentaerythritol triacrylate as polymerizable unsaturated compound (a3)

"UA0582B-30" (manufactured by Ube Industries Ltd.)

Urethane acrylate, which is a reaction product of the polycarbonate diol (a1) (manufactured by Ube Industries Ltd.), the polyisocyanate compound (a2), and the polymerizable unsaturated compound (a3) having a hydroxyl group Weight average molecular weight: 20,100

Number of polymerizable unsaturated functional groups per molecule: 6

Content of alicyclic structure in urethane (meth)acrylate (A): 18.3% by mass based on mass of urethane (meth)acrylate (A)

Content of alicyclic structure in polycarbonate diol (a1): 10.7% by mass based on mass of urethane (meth)acrylate (A)

B-type viscosity when diluted with butyl acetate to solid content of 50% by mass under conditions of 25° C. and 6 rpm: 49,900 mPa·s Using alicyclic diisocyanate as polyisocyanate compound (a2)

Using pentaerythritol triacrylate as polymerizable unsaturated compound (a3)

"UA0484B" (manufactured by Ube Industries, Ltd.)

Urethane acrylate, which is a reaction product of the polycarbonate diol (a1) (manufactured by Ube Industries Ltd.), the polyisocyanate compound (a2), and the polymerizable unsaturated compound (a3) having a hydroxyl group Weight average molecular weight: 13,100

Number of polymerizable unsaturated functional groups per molecule: 4

Content of alicyclic structure in urethane (meth)acrylate (A): 27.6% by mass based on mass of urethane (meth)acrylate (A)

Content of alicyclic structure in polycarbonate diol (a1): 20.0% by mass based on mass of urethane (meth)acrylate (A)

B-type viscosity when diluted with butyl acetate to solid content of 50% by mass under conditions of 25° C. and 6 rpm: 3,100 mPa·s Using alicyclic diisocyanate as polyisocyanate compound (a2)

Using pentaerythritol triacrylate and 4-hydroxybutyl acrylate at an equivalent ratio of 1:1 as polymerizable unsaturated compound (a3)

"UA0036B" (manufactured by Ube Industries Ltd.)

Urethane acrylate, which is a reaction product of the polycarbonate diol (a1) (manufactured by Ube Industries Ltd.), the polyisocyanate compound (a2), and the polymerizable unsaturated compound (a3) having a hydroxyl group Weight average molecular weight: 14,300

Number of polymerizable unsaturated functional groups per molecule: 6

Content of alicyclic structure in urethane (meth)acrylate (A): 26.6% by mass based on mass of urethane (meth)acrylate (A)

Content of alicyclic structure in polycarbonate diol (a1): 19.3% by mass based on mass of urethane (meth)acrylate (A)

B-type viscosity when diluted with butyl acetate to solid content of 50% by mass under conditions of 25° C. and 6 rpm: 3,230 mPa·s Using alicyclic diisocyanate as polyisocyanate compound (a2)

Using pentaerythritol triacrylate as polymerizable unsaturated compound (a3)

"UA0592B" (manufactured by Ube Industries, Ltd.)

Urethane acrylate, which is a reaction product of the polycarbonate diol (a1) (manufactured by Ube Industries Ltd.), the polyisocyanate compound (a2), and the polymerizable unsaturated compound (a3) having a hydroxyl group Weight average molecular weight: 16,000

Number of polymerizable unsaturated functional groups per molecule: 10

Content of alicyclic structure in urethane (meth)acrylate (A): 16.1% by mass based on mass of urethane (meth)acrylate (A)

Content of alicyclic structure in polycarbonate diol (a1): 9.1% by mass based on mass of urethane (meth)acrylate (A)

B-type viscosity when diluted with butyl acetate to solid content of 50% by mass under conditions of 25° C. and 6 rpm: 28,000 mPa·s Using alicyclic diisocyanate as polyisocyanate compound (a2)

Using dipentaerythritol pentaacrylate as polymerizable unsaturated compound (a3)

It is noted that dipentaerythritol pentaacrylate comes under the polymerizable unsaturated compound (a3") having one hydroxyl group and two or more polymerizable unsaturated groups in one molecule thereof.

"UA0503B" (manufactured by Ube Industries, Ltd.)

Urethane acrylate, which is a reaction product of the polycarbonate diol (a1) (manufactured by Ube Industries Ltd.), the polyisocyanate compound (a2), and the polymerizable unsaturated compound (a3) having a hydroxyl group Weight average molecular weight: 14,300

Number of polymerizable unsaturated functional groups per molecule: 6

Content of alicyclic structure in urethane (meth)acrylate (A): 18.9% by mass based on mass of urethane (meth)acrylate (A)

Content of alicyclic structure in polycarbonate diol (a1): 11.7% by mass based on mass of urethane (meth)acrylate (A)

B-type viscosity when diluted with butyl acetate to solid content of 50% by mass under conditions of 25° C. and 6 rpm: 2,040 mPa·s Using alicyclic diisocyanate as polyisocyanate compound (a2)

Using pentaerythritol triacrylate as polymerizable unsaturated compound (a3)

"UA0505B" (manufactured by Ube Industries, Ltd.)

Urethane acrylate, which is a reaction product of the polycarbonate diol (a1) (manufactured by Ube Industries Ltd.), the polyisocyanate compound (a2), and the polymerizable unsaturated compound (a3) having a hydroxyl group Weight average molecular weight: 14,100

Number of polymerizable unsaturated functional groups per molecule: 6

Content of alicyclic structure in urethane (meth)acrylate (A): 16.0% by mass based on mass of urethane (meth)acrylate (A)

Content of alicyclic structure in polycarbonate diol (a1): 8.7% by mass based on mass of urethane (meth)acrylate (A)

B-type viscosity when diluted with butyl acetate to solid content of 50% by mass under conditions of 25° C. and 6 rpm: 2,310 mPa·s Using alicyclic diisocyanate as polyisocyanate compound (a2)

Using pentaerythritol triacrylate as polymerizable unsaturated compound (a3)

"UA0500B" (manufactured by Ube Industries, Ltd.)

Urethane acrylate, which is a reaction product of the polycarbonate diol (a1) (manufactured by Ube Industries Ltd.), the polyisocyanate compound (a2), and the polymerizable unsaturated compound (a3) having a hydroxyl group Weight average molecular weight: 14,400

Number of polymerizable unsaturated functional groups per molecule: 6

Content of alicyclic structure in urethane (meth)acrylate (A): 10.3% by mass based on mass of urethane (meth)acrylate (A)

Content of alicyclic structure in polycarbonate diol (a1): 10.3% by mass based on mass of urethane (meth)acrylate (A)

B-type viscosity when diluted with butyl acetate to solid content of 50% by mass under conditions of 25° C. and 6 rpm: 2,000 mPa·s Using aliphatic diisocyanate as polyisocyanate compound (a2)

Using pentaerythritol triacrylate as polymerizable unsaturated compound (a3)

"UA0065B" (manufactured by Ube Industries Ltd.)

Urethane acrylate, which is a reaction product of the polycarbonate diol (a1) (manufactured by Ube Industries Ltd.), the polyisocyanate compound (a2), and the polymerizable unsaturated compound (a3) having a hydroxyl group Weight average molecular weight: 13,400

Number of polymerizable unsaturated functional groups per molecule: 6

Content of alicyclic structure in urethane (meth)acrylate (A): 8.9% by mass based on mass of urethane (meth)acrylate (A)

Content of alicyclic structure in polycarbonate diol (a1): 0.7% by mass based on mass of urethane (meth)acrylate (A)

B-type viscosity when diluted with butyl acetate to solid content of 50% by mass under conditions of 25° C. and 6 rpm: 1,789 mPa·s Using alicyclic diisocyanate as polyisocyanate compound (a2)

Using pentaerythritol triacrylate as polymerizable unsaturated compound (a3)

In Comparative Examples, the following urethane (meth) acrylate was used as urethane (meth)acrylate that does not fall under the urethane (meth)acrylate (A).

"Urethane acrylate UA0584B" (manufactured by Ube Industries Ltd.)

Urethane acrylate, which is a reaction product of the polycarbonate diol (a1) (manufactured by Ube Industries Ltd.), the polyisocyanate compound (a2), and the polymerizable unsaturated compound (a3) having a hydroxyl group Weight average molecular weight: 10,600

Number of polymerizable unsaturated functional groups per molecule: 2

Content of alicyclic structure in urethane (meth)acrylate (A): 19.1% by mass based on mass of urethane (meth)acrylate (A)

Content of alicyclic structure in polycarbonate diol (a1): 10.7% by mass based on mass of urethane (meth)acrylate (A)

B-type viscosity when diluted with butyl acetate to solid content of 50% by mass under conditions of 25° C. and 6 rpm: 1,330 mPa·s Using alicyclic diisocyanate as polyisocyanate compound (a2)

Using 4-hydroxybutyl acrylate as polymerizable unsaturated compound (a3)

"Urethane acrylate UA0580B" (manufactured by Ube Industries Ltd.)

Urethane acrylate, which is a reaction product of the polycarbonate diol (a1) (manufactured by Ube Industries Ltd.), the polyisocyanate compound (a2), and the polymerizable unsaturated compound (a3) having a hydroxyl group Weight average molecular weight: 7,700

Number of polymerizable unsaturated functional groups per molecule: 6

Content of alicyclic structure in urethane (meth)acrylate (A): 15.6% by mass based on mass of urethane (meth)acrylate (A)

Content of alicyclic structure in polycarbonate diol (a1): 7.8% by mass based on mass of urethane (meth)acrylate (A)

B-type viscosity when diluted with butyl acetate to solid content of 50% by mass under conditions of 25° C. and 6 rpm: 330 mPa·s Using alicyclic diisocyanate as polyisocyanate compound (a2)

Using pentaerythritol triacrylate as polymerizable unsaturated compound (a3)

"ARTRESIN UN-5500" (manufactured by Negami Chemical Industrial Co., Ltd.)

Urethane acrylate having polycarbonate skeleton

Weight average molecular weight: 50,000

"Shikoh UV-7610B" (manufactured by Nippon Synthetic Chemical Industry Co., Ltd.)

Urethane acrylate having polyether skeleton

Weight average molecular weight: 11,000

"ETERCURE 6194" (manufactured by Eternal materials co., Ltd.)

Urethane acrylate having polyester skeleton

Weight average molecular weight: 10,000

Urethane (meth)acrylate (B)

Production of Urethane (meth)acrylate (B1)

A mixture of 50.0 parts of Sumidur N3300 (manufactured by Sumika Bayer Urethane Co., Ltd.), 0.02 part of dibutyltin dilaurate, and 0.1 part of p-methoxyphenol was put into a reaction vessel equipped with a stirrer, a thermometer, a reflux condenser, an air introduction pipe, and a dropping device. The mixture was stirred while blowing dry air and heated to 80° C.

Subsequently, 37.7 parts of 4-hydroxybutyl acrylate was added dropwise over 2 hours while keeping the temperature of the mixture 90° C. or lower, and the mixture was further stirred at 80° C. for 4 hours. The reaction was finished after confirming that an isocyanate group had disappeared by (infrared absorption) analysis of the reaction product. A urethane acrylate solution (B1-1) having a non-volatile content of 60% by mass was obtained by adding 21.9 parts of 1-methoxy-2-propanol to the reaction product.

A weight average molecular weight of the urethane acrylate was 1,900 (GPC measurement, in terms of polystyrene), and the number of polymerizable unsaturated groups per molecule was three.

The confirmation of the urethanation reaction was performed by the method for measuring the isocyanate equivalent described in the section of the urethane (meth)acrylate (B).

In addition to the urethane acrylate solution (B1-1) obtained above, the following products were used as the urethane (meth)acrylate (B) having the weight average molecular weight in a range of 1,000 or more and less than 10,000.

"EBECRYL 8402" (manufactured by Daicel-allnex Ltd.)

Weight average molecular weight: 1,000

Number of polymerizable unsaturated groups per molecule: 2

"Shikoh UV-7510B" (manufactured by Nippon Synthetic Chemical Industry Co., Ltd.)

Weight average molecular weight: 3,500

Number of polymerizable unsaturated groups per molecule: 3

"ETERCURE DR-U065B" (manufactured by Eternal materials co., Ltd.)

Weight average molecular weight: 6,000

Number of polymerizable unsaturated groups per molecule: 2

"Art Resin UN-952" (manufactured by Negami Chemical Industrial Co., Ltd.)

Weight average molecular weight: 8,750

Number of polymerizable unsaturated groups per molecule: 10

In Comparative Examples, the following urethane (meth) acrylate was used as urethane (meth)acrylate that does not fall under the urethane (meth)acrylate (B).

"EBECRYL 4858" (manufactured by Daicel-allnex Ltd.)

Weight average molecular weight: 450

Number of polymerizable unsaturated groups per molecule: 2

"EBECRYL 8411" (manufactured by Daicel-allnex Ltd.)

Weight average molecular weight: 12,000

Number of polymerizable unsaturated groups per molecule: 2

Compound (C)

As the polymerizable unsaturated compound (c1) having three or more polymerizable unsaturated groups in one molecule thereof and having a weight average molecular weight in a range of 280 or more and less than 1,000, the following products were used.

"NK Ester A-DPH" (manufactured by Shin-Nakamura Chemical Co., Ltd.)
   Dipentaerythritol hexaacrylate
   Weight average molecular weight: 578
   Number of polymerizable unsaturated groups per molecule: 6

"Aronix M-450" (manufactured by Toagosei Co., Ltd.)
   Pentaerythritol tetraacrylate
   Weight average molecular weight: 352
   Number of polymerizable unsaturated groups per molecule: 4

"MIRAMER 410" (manufactured by MIWON)
   Ditrimethylolpropane tetraacrylate
   Weight average molecular weight: 466
   Number of polymerizable unsaturated groups per molecule: 4

"NK Ester A-TMPT" (manufactured by Shin-Nakamura Chemical Co., Ltd.)
   Trimethylolpropane triacrylate
   Weight average molecular weight: 296
   Number of polymerizable unsaturated groups per molecule: 3

"MIRAMER 370" (manufactured by MIWON)
   Tris(2-hydroxyethyl)isocyanurate triacrylate
   Weight average molecular weight: 423
   Number of polymerizable unsaturated groups per molecule: 3

As the polymerizable unsaturated compound (c2) having an alicyclic structure and one or two polymerizable unsaturated groups in one molecule thereof and having a weight average molecular weight in a range of 200 or more and less than 1,000, the following products were used.

"IRR214-K" (manufactured by Daicel-allnex Ltd.)
   Tricyclodecane dimethanol diacrylate
   Weight average molecular weight: 300
   Number of polymerizable unsaturated groups per molecule: 2

"Sartomer CD406" (manufactured by Sartomer Co., Inc.)
   1,4-cyclohexanedimethanol diacrylate
   Weight average molecular weight: 252
   Number of polymerizable unsaturated groups per molecule: 2

"Fancryl FA-513AS" (manufactured by Hitachi Chemical Co., Ltd.)
   Dicyclopentanyl acrylate
   Weight average molecular weight: 206
   Number of polymerizable unsaturated groups per molecule: 1

"IBXA" (manufactured by Osaka Organic Chemical Industry Ltd.)
   Isobornyl acrylate
   Weight average molecular weight: 208
   Number of polymerizable unsaturated groups per molecule: 1

"Sartomer SR217NS" (manufactured by Sartomer Co., Inc.)
   4-tert-butyl cyclohexyl acrylate
   Weight average molecular weight: 210
   Number of polymerizable unsaturated groups per molecule: 1

As the (meth)acrylamide compound (c3) having a weight average molecular weight in a range of 110 or more and less than 1,000, the following products were used.

"ACMO" (manufactured by KJ Chemicals Corporation)
   Acryloylmorpholine
   Weight average molecular weight: 141

"HEAA" (manufactured by KJ Chemicals Corporation)
   2-hydroxyethylacrylamide
   Weight average molecular weight: 115

In Comparative Examples, the following compounds were used as compounds that do not fall under the compounds (c1) to (c3).

"EBECRYL 810" (manufactured by Daicel-allnex Ltd.)
   Polyester acrylate
   Weight average molecular weight: 1,000
   Number of polymerizable unsaturated groups per molecule: 4

"ARONIX MT-3547" (manufactured by Toagosei Co., Ltd.)
   Glycerin triacrylate
   Weight average molecular weight: 254
   Number of polymerizable unsaturated groups per molecule: 3

"ACRYX CHA" (manufactured by Toagosei Co., Ltd.)
   Cyclohexyl acrylate
   Weight average molecular weight: 154
   Number of polymerizable unsaturated groups per molecule: 1

"DMAA" (manufactured by KJ Chemicals Corporation)
   Dimethyl acrylamide
   Weight average molecular weight: 99
   Number of polymerizable unsaturated groups per molecule: 1

Photopolymerization Initiator (D)

The following products were used as the photopolymerization initiator (D).

"Omnirad 184" (trade name, manufactured by IGM resins, solid content: 100%)

"Omnirad TPO H" (trade name, manufactured by IGM resins, solid content: 100%)

Example 1

Preparation of Active Energy Ray-Curable Coating Composition

The following ingredients were uniformly mixed: 40 parts (solid content: 20 parts) of "urethane acrylate UA0581B" (manufactured by Ube Industries, Ltd.), 15 parts (solid content: 15 parts) of "EBECRYL 8402" (manufactured by Daicel-allnex Ltd.), 16.7 parts (solid content: 10 parts) of a urethane acrylate solution (B1-1), 20 parts (solid content: 20 parts) of "Shikoh UV-7510B " (manufactured by Nippon Synthetic Chemical Industry Co., Ltd.), 20 parts (solid content: 20 parts) of "IRR 214-K" (manufactured by Daicel-allnex Ltd.), 15 parts (solid content: 15 parts) of "ACMO" (manufactured by KJ Chemicals Ltd.), 5 parts of "Omnirad 184" (trade name, manufactured by IGM resins, photopolymerization initiator, solid content: 100%), 1 part of "Omnirad TPO H" (trade name, manufactured by IGM resins, photopolymerization initiator, solid content: 100%), 1.56 parts (1.33 parts of active ingredient) of "TINUVIN 400" (trade name, manufactured by BASF, triazine-based ultraviolet absorber, solid content: 85%), 0.67 part of "TINUVIN 479" (trade name, manufactured by BASF, triazine-based ultraviolet absorber, solid content: 100%), 2 parts of "TINUVIN 292" (trade name, manufactured by BASF, hindered amine-based light stabilizer, solid content: 100%), and 0.30 part (0.12 part of active ingredient) of "BYK-UV-3505" (trade name, manufactured by BYK-Chemie, silicon-based surface conditioner, active component: 40%).

Further, the mixture was diluted and stirred with isobutyl acetate so as to have a solid content of 40%, thereby obtaining an active energy ray-curable coating composition in Example 1.

Examples 2 to 39 and Comparative Examples 1 to 14

An active energy ray-curable coating composition having a solid content of 40% was obtained in the same manner as in Example 1, except that blending compositions in Example 1 were changed as shown in Tables 1 to 7. The blending compositions shown in Tables 1 to 7 are based on a solid content mass of each component.

Preparation of Test Coated Plate

Object to be Coated

ABS Substrate

A surface of an ABS (acrylonitrile-butadiene-styrene) plate of 100 mm×150 mm×3.0 mm was degreased with isopropyl alcohol to obtain an ABS substrate.

ASA Substrate

A surface of an ASA (acrylonitrile-styrene-acrylate) plate of 100 mm×150 mm×3.0 mm was degreased with isopropyl alcohol to obtain an ASA substrate.

Test Coated Plate

The active energy ray-curable coating compositions obtained in Examples 1 to 34 and Comparative Examples 1 to 14 were applied onto the ABS substrate using an air spray so as to have a film thickness of 30 μm. Subsequently, the ABS substrate was allowed to stand at room temperature for 1 minute, and then preheated at 80° C. for 3 minutes. Next, UV irradiation was performed at 400 mW/cm$^2$ and 1,500 mJ/cm$^2$ using a metal halide lamp to prepare a test coated plate.

In Example 35, a test coated plate was produced in the same manner as in Example 1, except that the active energy ray-curable coating composition obtained in Example 35 was applied using an air spray so as to have a film thickness of 15 μm.

In Example 36, a test coated plate was produced in the same manner as in Example 1, except that the active energy ray-curable coating composition obtained in Example 36 was applied using the air spray so as to have a film thickness of 25 μm.

In Example 37, a test coated plate was produced in the same manner as in Example 1, except that the active energy ray-curable coating composition obtained in Example 37 was applied using the air spray so as to have a film thickness of 35 μm.

In Example 38, a test coated plate was produced in the same manner as in Example 1, except that the active energy ray-curable coating composition obtained in Example 38 was applied using the air spray so as to have a film thickness of 45 μm.

In Example 39, a test coated plate was produced in the same manner as in Example 1, except that the active energy ray-curable coating composition obtained in Example 39 was applied on the ASA substrate using the air spray so as to have a film thickness of 30 μm.

Evaluation Test

In order to evaluate the coating films obtained by the active energy ray-curable coating compositions in Examples and Comparative Examples, the following tests were performed. The results are shown in Tables 1 to 7.

Substrate Followability

Each of the active energy ray-curable coating compositions obtained above was applied onto a polypropylene plate using the air spray so as to have a cured film thickness of 30 μm±5 μm, allowed to stand at room temperature for 1 minute, and preheated at 80° C. for 3 minutes. Next, a cured coating film was formed by performing UV irradiation at 400 mW/cm$^2$ and 1,500 mJ/cm$^2$ using a metal halide lamp. Thereafter, the cured coating film was cut into a rectangular shape having a length of 80 mm and a width of 10 mm, and the rectangular-shaped coating film obtained by peeling from the polypropylene plate was used as a coating film for a substrate followability test.

The resulting test coating film was attached to an autograph "EZTest EZ-LX HS" (manufactured by Shimadzu Corporation) in which a distance between chucks was set to 50 mm under conditions of 23° C.±2° C./50%±10% RH. An elongation percentage at break was measured at a tensile rate of 5 mm/min based on the following formula, and the substrate followability was evaluated based on the following criteria. The larger the elongation percentage at break is, the more excellent the substrate followability is.

Elongation percentage at break (%) =
(distance between chucks at break − distance between chucks before test)/(distance between chucks before test)×100

A: The elongation percentage at break was 25% or more.
B: The elongation percentage at break was 20% or more and less than 25%.
C: The elongation percentage at break was 15% or more and less than 20%.
D: The elongation percentage at break was 10% or more and less than 15%.
E: The elongation percentage at break was less than 10%.

Adhesion

The resulting test coated plate was immersed in warm water at 40° C. for 240 hours, pulled up, and dried at 20° C. for 24 hours, and then a coating film of the test coating plate was cut into a grid pattern with a cutter so as to reach a base, and 100 grids each having a size of 1 mm×1 mm were made. Subsequently, an adhesive cellophane tape was attached to the surface thereof, then a residual state of the grids of the coating film after the tape was rapidly peeled off at a temperature of 21° C.±2° C. and a humidity of 50%±5% relative humidity was examined, and the adhesion was evaluated based on the following criteria.

A: The grids of the coating film remained 100, and small edge chipping of the coating film did not occur at an edge of cut of the cutter.

B: The grids of the coating film remained 100, but small edge chipping of the coating film occurred at the edge of the cut of the cutter.
C: The grids of the coating film remained 90 to 99.
D: The grids of the coating film remained 80 to 89.
E: The grids of the coating film remained 79 or less.

Car-Wash Scratching Resistance

A 20-degree specular reflectance (20° gloss value) of the resulting test coated sheet was measured in advance using a gloss meter manufactured by BYK Gardner Co., Ltd.

The test coated plate was attached to a car-wash scratching tester manufactured by Amtec Kistler Co., Ltd., and a car-wash scratching test of 10 reciprocations was performed while spraying 1.5 g/L of silica (SIKRON SH200 manufactured by Quarzwake Co., Ltd.) suspended aqueous solution at room temperature in accordance with DIN EN ISO 20566. The test coated plate was washed with water and wiped with isopropyl alcohol, and then the 20-degree specular reflectance (20° gloss value) was measured using the gloss meter manufactured by BYK Gardner Co., Ltd.

A retention rate (%) of the 20° gloss value after the car-wash scratching test with respect to the 20° gloss value before the car-wash scratching test was evaluated based on the following criteria. The higher the gloss retention rate is, the better the car-wash scratching resistance is.
A: The gloss retention rate was 80% or more.
B: The gloss retention rate was 70% or more and less than 80%.
C: The gloss retention rate was 60% or more and less than 70%.
D: The gloss retention rate was 50% or more and less than 60%.
E: The gloss retention rate was less than 50%.

Coating Film Hardness

Martens hardness (N/mm$^2$) of the resulting test coated plate was measured using "Fischer scope (registered trademark) HM2000S" (trade name, manufactured by Fisher Instruments Co., Ltd.). Measurement conditions were as follows: indenter: a quadrangular pyramid-shaped Vickers indenter (material: diamond, facing angle:)136°, maximum test load: 20 mN, pressing speed: 20 mN/25 seconds, temperature: 21° C.±2° C., humidity: 50° C.±5° C. relative humidity.
A: The Martens hardness was 125 N/mm$^2$ or more.
B: The Martens hardness was 100 N/mm$^2$ or more and less than 125 N/mm$^2$.
C: The Martens hardness was 75 N/mm$^2$ or more and less than 100 N/mm$^2$.
D: The Martens hardness was 50 N/mm$^2$ or more and less than 75 N/mm$^2$.
E: The Martens hardness was less than 50 N/mm$^2$.

Weather Resistance

The resulting test coated plate was irradiated with light from an angle of 25° with respect to an axis perpendicular to a coating film surface using a multi-angle spectrophotometer "CM-512m3" (manufactured by Konica Minolta, Inc.), and L*, a*, and b* of light in a direction perpendicular to the coating film surface among the reflected light were measured. Next, each of the test coated plates was subjected to an accelerated weather resistance test in accordance with JIS K5600-7-7 using a weather resistance tester "Super Xenon Weather Meter" (manufactured by Suga Test Instruments Co., Ltd.) under the conditions of a test piece wetting cycle of 18 minutes/2 hours, a black panel temperature of 61° C. to 65° C., and a lamp irradiation time of 1,200 hours.

Next, each test plate was irradiated with light from an angle of 25° with respect to an axis perpendicular to the coating film surface using the multi-angle spectrophotometer "CM-512m3" (manufactured by Konica Minolta, Inc.), and L*, a*, and b* of light in the direction perpendicular to the coating film surface among the reflected light were measured. Next, ΔE* was calculated from L*, a*, and b* colorimetric values before and after the accelerated weather resistance test in accordance with JIS K5600-4-6 (1999), and was evaluated based on the following criteria. The smaller the color difference ΔE* is, the smaller the discoloration of the test plate is and the better the weather resistance is.
A: ΔE* was less than 3.0.
B: ΔE* was 3.0 or more and less than 3.5.
C: ΔE* was 3.5 or more and less than 4.0.
D: ΔE* was 4.0 or more and less than 5.0.
E: ΔE* was 5.0 or more.

TABLE 1

| | | | Examples | | | | | | | |
|---|---|---|---|---|---|---|---|---|---|---|
| | | Product name | 1 | 2 | 3 | 4 | 5 | 6 | 7 | 8 |
| (A) Urethane (meth)acrylate | | UA0581B | 20 | — | — | — | — | — | — | — |
| | | UA0499B | — | 20 | — | — | — | — | — | — |
| | | UA0582B-30 | — | — | 20 | — | — | — | — | — |
| | | UA0484B | — | — | — | 20 | — | — | — | — |
| | | UA0036B | — | — | — | — | 20 | — | — | — |
| | | UA0592B | — | — | — | — | — | 20 | — | — |
| | | UA0503B | — | — | — | — | — | — | 20 | — |
| | | UA0505B | — | — | — | — | — | — | — | 20 |
| (B) Urethane (meth)acrylate | | EBECRYL 8402 | 15 | 15 | 15 | 15 | 15 | 15 | 15 | 15 |
| | | B1-1 | 10 | 10 | 10 | 10 | 10 | 10 | 10 | 10 |
| | | Shikoh UV-7510B | 20 | 20 | 20 | 20 | 20 | 20 | 20 | 20 |
| (C) Compound | (c2) | IRR 214-K | 20 | 20 | 20 | 20 | 20 | 20 | 20 | 20 |
| | (c3) | ACMO | 15 | 15 | 15 | 15 | 15 | 15 | 15 | 15 |

TABLE 1-continued

|  | Product name | \multicolumn{8}{c}{Examples} |||||||||
| --- | --- | --- | --- | --- | --- | --- | --- | --- | --- |
|  |  | 1 | 2 | 3 | 4 | 5 | 6 | 7 | 8 |
| Blending amount of (A) to (C) | (A) Urethane (meth)acrylate | 20 | 20 | 20 | 20 | 20 | 20 | 20 | 20 |
|  | (B) Urethane (meth)acrylate | 45 | 45 | 45 | 45 | 45 | 45 | 45 | 45 |
|  | (C) Compound | 35 | 35 | 35 | 35 | 35 | 35 | 35 | 35 |
|  | Total | 100 | 100 | 100 | 100 | 100 | 100 | 100 | 100 |
| (D) Photopolymerization initiator | Omnirad 184 | 5 | 5 | 5 | 5 | 5 | 5 | 5 | 5 |
|  | Omnirad TPO H | 1 | 1 | 1 | 1 | 1 | 1 | 1 | 1 |
| Ultraviolet absorber | TINUVIN 400 | 1.33 | 1.33 | 1.33 | 1.33 | 1.33 | 1.33 | 1.33 | 1.33 |
|  | TINUVIN 479 | 0.67 | 0.67 | 0.67 | 0.67 | 0.67 | 0.67 | 0.67 | 0.67 |
| Light stabilizer | TINUVIN 292 | 2 | 2 | 2 | 2 | 2 | 2 | 2 | 2 |
| Surface conditioner | BYK UV-3505 | 0.12 | 0.12 | 0.12 | 0.12 | 0.12 | 0.12 | 0.12 | 0.12 |
| Coating film performance | Substrate followability | B | A | A | B | C | C | B | A |
|  | Adhesion | A | A | C | B | C | C | B | A |
|  | Car-wash scratching resistance | C | A | A | B | B | B | B | A |
|  | Coating film hardness | A | A | B | B | A | A | A | B |
|  | Weather resistance | A | A | B | A | A | B | A | B |

TABLE 2

|  |  | Product name | \multicolumn{8}{c}{Examples} |||||||||
| --- | --- | --- | --- | --- | --- | --- | --- | --- | --- | --- |
|  |  |  | 9 | 10 | 11 | 12 | 13 | 14 | 15 | 16 |
| (A) Urethane (meth)acrylate |  | UA0499B | — | — | 20 | 20 | 20 | 20 | 20 | 20 |
|  |  | UA0500B | 20 | — | — | — | — | — | — | — |
|  |  | UA0065B | — | 20 | — | — | — | — | — | — |
| (B) Urethane (meth)acrylate |  | EBECRYL 8402 | 15 | 15 | 45 | 15 | 15 | 15 | 15 | 15 |
|  |  | B1-1 | 10 | 10 | — | 30 | — | — | — | 10 |
|  |  | Shikoh UV-7510B | 20 | 20 | — | — | — | — | — | 20 |
|  |  | ETERCURE DR-U065B | — | — | — | — | 30 | — | — | — |
|  |  | ARTRESIN UN-952 | — | — | — | — | — | 30 | — | — |
|  |  |  | — | — | — | — | — | — | 30 | — |
| (C) Compound | (c1) | NK Ester A-DPH | — | — | — | — | — | — | — | 20 |
|  | (c2) | IRR 214-K | 20 | 20 | 20 | 20 | 20 | 20 | 20 | — |
|  | (c3) | ACMO | 15 | 15 | 15 | 15 | 15 | 15 | 15 | 15 |
| Blending amount of (A) to (C) | (A) Urethane (meth)acrylate |  | 20 | 20 | 20 | 20 | 20 | 20 | 20 | 20 |
|  | (B) Urethane (meth)acrylate |  | 45 | 45 | 45 | 45 | 45 | 45 | 45 | 45 |
|  | (C) Compound |  | 35 | 35 | 35 | 35 | 35 | 35 | 35 | 35 |
|  | Total |  | 100 | 100 | 100 | 100 | 100 | 100 | 100 | 100 |
| (D) Photopolymerization initiator | Omnirad 184 |  | 5 | 5 | 5 | 5 | 5 | 5 | 5 | 5 |
|  | Omnirad TPO H |  | 1 | 1 | 1 | 1 | 1 | 1 | 1 | 1 |
| Ultraviolet absorber | TINUVIN 400 |  | 1.33 | 1.33 | 1.33 | 1.33 | 1.33 | 1.33 | 1.33 | 1.33 |
|  | TINUVIN 479 |  | 0.67 | 0.67 | 0.67 | 0.67 | 0.67 | 0.67 | 0.67 | 0.67 |
| Light stabilizer | TINUVIN 292 |  | 2 | 2 | 2 | 2 | 2 | 2 | 2 | 2 |
| Surface conditioner | BYK UV-3505 |  | 0.12 | 0.12 | 0.12 | 0.12 | 0.12 | 0.12 | 0.12 | 0.12 |
| Coating film performance | Substrate followability |  | A | A | A | C | A | A | A | C |
|  | Adhesion |  | A | A | A | C | A | A | C | C |
|  | Car-wash scratching resistance |  | A | A | A | B | A | B | A | B |
|  | Coating film hardness |  | C | C | C | A | B | C | B | A |
|  | Weather resistance |  | B | C | B | A | A | B | A | A |

TABLE 3

|  |  | Product name | \multicolumn{7}{c}{Examples} ||||||||
| --- | --- | --- | --- | --- | --- | --- | --- | --- | --- |
|  |  |  | 17 | 18 | 19 | 20 | 21 | 22 | 23 |
| (A) Urethane (meth)acrylate |  | UA0499B | 20 | 20 | 20 | 20 | 20 | 20 | 20 |
| (B) Urethane (meth)acrylate |  | EBRCRYL 8402 | 15 | 15 | 15 | 15 | 15 | 15 | 15 |
|  |  | B1-1 | 10 | 10 | 10 | 10 | 10 | 10 | 10 |
|  |  | Shikoh UV-7510B | 20 | 20 | 20 | 20 | 20 | 20 | 20 |
| (C) Compound | (c1) | Aronix M-450 | 20 | — | — | — | — | — | — |
|  |  | MIRAMER M410 | — | 20 | — | — | — | — | — |
|  |  | NK Ester A-TMPT | — | — | 20 | — | — | — | — |
|  |  | MIRAMER M370 | — | — | — | 20 | — | — | — |

TABLE 3-continued

|  |  | Product name | Examples | | | | | | |
|---|---|---|---|---|---|---|---|---|---|
|  |  |  | 17 | 18 | 19 | 20 | 21 | 22 | 23 |
|  | (c2) | IRR 214-K | — | — | — | — | — | 10 | 10 |
|  |  | Sartomer CD406 | — | — | — | — | 20 | — | — |
|  |  | Fancryl FA-513AS | — | — | — | — | — | 10 | — |
|  |  | IBXA | — | — | — | — | — | — | 10 |
|  | (c3) | ACMO | 15 | 15 | 15 | 15 | 15 | 15 | 15 |
| Blending amount of (A) to (C) | (A) Urethane (meth)acrylate | | 20 | 20 | 20 | 20 | 20 | 20 | 20 |
|  | (B) Urethane (meth)acrylate | | 45 | 45 | 45 | 45 | 45 | 45 | 45 |
|  | (C) Compound | | 35 | 35 | 35 | 35 | 35 | 35 | 35 |
|  | Total | | 100 | 100 | 100 | 100 | 100 | 100 | 100 |
| (D) Photopolymerization initiator | Omnirad 184 | | 5 | 5 | 5 | 5 | 5 | 5 | 5 |
|  | Omnirad TPO H | | 1 | 1 | 1 | 1 | 1 | 1 | 1 |
| Ultraviolet absorber | TINUVIN 400 | | 1.33 | 1.33 | 1.33 | 1.33 | 1.33 | 1.33 | 1.33 |
|  | TINUVIN 479 | | 0.67 | 0.67 | 0.67 | 0.67 | 0.67 | 0.67 | 0.67 |
| Light stabilizer | TINUVIN 292 | | 2 | 2 | 2 | 2 | 2 | 2 | 2 |
| Surface conditioner | BYK UV-3505 | | 0.12 | 0.12 | 0.12 | 0.12 | 0.12 | 0.12 | 0.12 |
| Coating film performance | Substrate followability | | C | C | C | C | A | A | A |
|  | Adhesion | | C | B | C | B | A | A | A |
|  | Car-wash scratching resistance | | B | B | B | B | A | C | C |
|  | Coating film hardness | | A | A | A | A | B | B | B |
|  | Weather resistance | | A | A | A | A | B | B | B |

TABLE 4

|  |  | Product name | Examples | | | | | | | |
|---|---|---|---|---|---|---|---|---|---|---|
|  |  |  | 24 | 25 | 26 | 27 | 28 | 29 | 30 | 31 |
| (A) Urethane (meth)acrylate | UA0499B | | 20 | 20 | 20 | 20 | 20 | 25 | 40 | 10 |
| (B) Urethane (meth)acrylate | EBECRYL 8402 | | 15 | 15 | 15 | 15 | 15 | 15 | 10 | 20 |
|  | B1-1 | | 10 | 10 | 10 | 10 | 10 | 10 | — | 20 |
|  | Shikoh UV-7510B | | 20 | 20 | 20 | 20 | 20 | 20 | 15 | 30 |
| (C) Compound | (c1) | MIRAMER M370 | — | — | 35 | — | 15 | — | 20 | — |
|  | (c2) | IRR 214-K | 10 | 20 | — | 35 | 20 | — | — | 10 |
|  |  | Sartomer SR217NS | 10 | — | — | — | — | — | — | — |
|  | (c3) | ACMO | 15 | — | — | — | — | 30 | 15 | 10 |
|  |  | HEAA | — | 15 | — | — | — | — | — | — |
| Blending amount of (A) to (C) | (A) Urethane (meth)acrylate | | 20 | 20 | 20 | 20 | 20 | 25 | 40 | 10 |
|  | (B) Urethane (meth)acrylate | | 45 | 45 | 45 | 45 | 45 | 45 | 25 | 70 |
|  | (C) Compound | | 35 | 35 | 35 | 35 | 35 | 30 | 35 | 20 |
|  | Total | | 100 | 100 | 100 | 100 | 100 | 100 | 100 | 100 |
| (D) Photopolymerization initiator | Omnirad 184 | | 5 | 5 | 5 | 5 | 5 | 5 | 5 | 5 |
|  | Omnirad TPO H | | 1 | 1 | 1 | 1 | 1 | 1 | 1 | 1 |
| Ultraviolet absorber | TINUVIN 400 | | 1.33 | 1.33 | 1.33 | 1.33 | 1.33 | 1.33 | 1.33 | 1.33 |
|  | TINUVIN 479 | | 0.67 | 0.67 | 0.67 | 0.67 | 0.67 | 0.67 | 0.67 | 0.67 |
| Light stabilizer | TINUVIN 292 | | 2 | 2 | 2 | 2 | 2 | 2 | 2 | 2 |
| Surface conditioner | BYK UV-3505 | | 0.12 | 0.12 | 0.12 | 0.12 | 0.12 | 0.12 | 0.12 | 0.12 |
| Coating film performance | Substrate followability | | A | A | C | B | B | A | A | C |
|  | Adhesion | | A | A | C | B | C | A | C | A |
|  | Car-wash scratching resistance | | C | A | B | A | B | B | A | C |
|  | Coating film hardness | | B | B | A | A | A | C | C | B |
|  | Weather resistance | | B | B | A | A | A | C | B | A |

TABLE 5

|  | Product name | Examples | | | | | | | |
|---|---|---|---|---|---|---|---|---|---|
|  |  | 32 | 33 | 34 | 35 | 36 | 37 | 38 | 39 |
| (A) Urethane (meth)acrylate | UA0499B | 25 | 15 | 30 | 20 | 20 | 20 | 20 | 20 |
| (B) Urethane (meth)acrylate | EBECRYL 8402 | 15 | 20 | 10 | 15 | 15 | 15 | 15 | 15 |
|  | B1-1 | — | 20 | 5 | 10 | 10 | 10 | 10 | 10 |
|  | Shikoh UV-7510B | 10 | 20 | 15 | 20 | 20 | 20 | 20 | 20 |

TABLE 5-continued

|  | Product name | | 32 | 33 | 34 | 35 | 36 | 37 | 38 | 39 |
|---|---|---|---|---|---|---|---|---|---|---|
| (C) Compound | (c2) | IRR 214-K | 35 | 10 | 25 | 20 | 20 | 20 | 20 | 20 |
|  | (c3) | ACMO | 15 | 15 | 15 | 15 | 15 | 15 | 15 | 15 |
| Blending amount of | (A) Urethane (meth)acrylate | | 25 | 15 | 30 | 20 | 20 | 20 | 20 | 20 |
| (A) to (C) | (B) Urethane (meth)acrylate | | 25 | 60 | 30 | 45 | 45 | 45 | 45 | 45 |
|  | (C) Compound | | 50 | 25 | 40 | 35 | 35 | 35 | 35 | 35 |
|  | Total | | 100 | 100 | 100 | 100 | 100 | 100 | 100 | 100 |
| (D) Photopolymerization initiator | Omnirad 184 | | 5 | 5 | 5 | 5 | 5 | 5 | 5 | 5 |
|  | Omnirad TPO H | | 1 | 1 | 1 | 1 | 1 | 1 | 1 | 1 |
| Ultraviolet absorber | TINUVIN 400 | | 1.33 | 1.33 | 1.33 | 1.33 | 1.33 | 1.33 | 1.33 | 1.33 |
|  | TINUVIN 479 | | 0.67 | 0.67 | 0.67 | 0.67 | 0.67 | 0.67 | 0.67 | 0.67 |
| Light stabilizer | TINUVIN 292 | | 2 | 2 | 2 | 2 | 2 | 2 | 2 | 2 |
| Surface conditioner | BYK UV-3505 | | 0.12 | 0.12 | 0.12 | 0.12 | 0.12 | 0.12 | 0.12 | 0.12 |
| Coating film performance | Substrate followability | | A | B | A | B | A | A | A | A |
|  | Adhesion | | C | A | C | A | A | A | A | A |
|  | Car-wash scratching resistance | | A | C | A | A | A | A | A | A |
|  | Coating film hardness | | A | B | C | A | A | A | A | A |
|  | Weather resistance | | B | A | B | B | A | A | A | A |

TABLE 6

|  | Product name | | Comparative Examples | | | | | |
|---|---|---|---|---|---|---|---|---|
|  |  | | 1 | 2 | 3 | 4 | 5 | 6 |
| (A) Urethane (meth)acrylate | UA0499B | | — | — | — | — | — | 20 |
|  | UA0584B | | 20 | — | — | — | — | — |
|  | UA0580B | | — | 20 | — | — | — | — |
|  | ARTRESIN UN-5500 | | — | — | 20 | — | — | — |
|  | Shikoh UV-7610B | | — | — | — | 20 | — | — |
|  | ETERCURE 6194 | | — | — | — | — | 20 | — |
| (B) Urethane (meth)acrylate | EBECRYL 8402 | | 15 | 15 | 15 | 15 | 15 | — |
|  | B1-1 | | 10 | 10 | 10 | 10 | 10 | — |
|  | Shikoh UV-7510B | | 20 | 20 | 20 | 20 | 20 | — |
|  | EBECRYL 4858 | | — | — | — | — | — | 45 |
| (C) Compound | (c2) | IRR 214-K | 20 | 20 | 20 | 20 | 20 | 20 |
|  | (c3) | ACMO | 15 | 15 | 15 | 15 | 15 | 15 |
| Blending amount of | (A) Urethane (meth)acrylate | | 0 | 0 | 0 | 0 | 0 | 20 |
| (A) to (C) | (B) Urethane (meth)acrylate | | 45 | 45 | 45 | 45 | 45 | 0 |
|  | (C) Compound | | 35 | 35 | 35 | 35 | 35 | 35 |
|  | Total | | 80 | 80 | 80 | 80 | 80 | 55 |
| (D) Photopolymerization initiator | Omnirad 184 | | 5 | 5 | 5 | 5 | 5 | 5 |
|  | Omnirad TPO H | | 1 | 1 | 1 | 1 | 1 | 1 |
| Ultraviolet absorber | TINUVIN 400 | | 1.33 | 1.33 | 1.33 | 1.33 | 1.33 | 1.33 |
|  | TINUVIN 479 | | 0.67 | 0.67 | 0.67 | 0.67 | 0.67 | 0.67 |
| Light stabilizer | TINUVIN 292 | | 2 | 2 | 2 | 2 | 2 | 2 |
| Surface conditioner | BYK UV-3505 | | 0.12 | 0.12 | 0.12 | 0.12 | 0.12 | 0.12 |
| Coating film performance | Substrate followability | | A | D | A | B | C | D |
|  | Adhesion | | A | A | E | A | A | A |
|  | Car-wash scratching resistance | | B | D | B | C | D | C |
|  | Coating film hardness | | D | A | D | C | B | A |
|  | Weather resistance | | C | A | D | D | B | A |

TABLE 7

|  | Product name | Comparative Examples | | | | | | | |
|---|---|---|---|---|---|---|---|---|---|
|  |  | 7 | 8 | 9 | 10 | 11 | 12 | 13 | 14 |
| (A) Urethane (meth)acrylate | UA0499B | 20 | 20 | 20 | 20 | 20 | — | 45 | 30 |
| (B) Urethane (meth)acrylate | EBECRYL 8402 | — | 20 | 20 | 20 | 20 | — | — | 20 |
|  | B1-1 | — | 10 | 10 | 10 | 10 | — | — | 25 |
|  | Shikoh UV-7510B | — | 15 | 15 | 15 | 15 | 45 | — | 25 |
|  | ARTRESIN UN-952 | — | — | — | — | 20 | — | — | — |
|  | EBECRYL 8411 | 45 | — | — | — | — | — | — | — |

TABLE 7-continued

| | Product name | Comparative Examples | | | | | | | |
|---|---|---|---|---|---|---|---|---|---|
| | | 7 | 8 | 9 | 10 | 11 | 12 | 13 | 14 |
| (C) Compound (c1) | MIRAMHR M370 | — | — | — | — | — | — | 20 | — |
| (c2) | IRR 214-K | 20 | — | — | — | — | 20 | 20 | — |
| (c3) | ACM0 | 15 | — | — | — | — | 15 | 15 | — |
| | EBECRYL 810 | — | 35 | — | — | — | — | — | — |
| | ARONIX MT-3547 | — | — | 35 | — | — | — | — | — |
| | ACRYX CHA | — | — | — | 35 | — | — | — | — |
| | DMAA | — | — | — | — | 35 | — | — | — |
| Blending amount of (A) to (C) | (A) Urethane (meth)acrylate | 20 | 20 | 20 | 20 | 20 | 0 | 45 | 30 |
| | (B) Urethane (meth)acrylate | 0 | 45 | 45 | 45 | 45 | 65 | 0 | 70 |
| | (C) Compound | 35 | 0 | 0 | 0 | 0 | 35 | 55 | 0 |
| | Total | 55 | 65 | 65 | 65 | 65 | 100 | 100 | 100 |
| (D) | Omnirad 184 | 5 | 5 | 5 | 5 | 5 | 5 | 5 | 5 |
| Photopolymerization initiator | Onmirad TPO H | 1 | 1 | 1 | 1 | 1 | 1 | 1 | 1 |
| Ultraviolet absorber | TINUVIN 400 | 1.33 | 1.33 | 1.33 | 1.33 | 1.33 | 1.33 | 1.33 | 1.33 |
| | TINUVIN 479 | 0.67 | 0.67 | 0.67 | 0.67 | 0.67 | 0.67 | 0.67 | 0.67 |
| Light stabilizer | TINUVIN 292 | 2 | 2 | 2 | 2 | 2 | 2 | 2 | 2 |
| Surface conditioner | BYK UV-3505 | 0.12 | 0.12 | 0.12 | 0.12 | 0.12 | 0.12 | 0.12 | 0.12 |
| Coating film performance | Substrate followability | A | B | C | A | D | D | D | A |
| | Adhesion | C | D | D | B | A | A | C | D |
| | Car-wash scratching resistance | A | B | B | B | B | D | C | A |
| | Coating film hardness | D | D | A | D | C | B | D | D |
| | Weather resistance | C | D | A | D | C | C | C | C |

From the above results, it was found that the active energy ray-curable coating composition according to the present invention can form a coating film excellent in the substrate followability, the adhesion, the car-wash scratching resistance, the hardness, and the weather resistance.

Although the present invention has been described in detail and with reference to particular embodiments, it will be apparent to those skilled in the art that various changes and modifications can be made without departing from the spirit and scope of the invention. The present application is based on Japanese Patent Application No. 2019-36452 filed on Feb. 28, 2019, contents of which are incorporated herein by reference.

The invention claimed is:

1. An active energy ray-curable coating composition, comprising the following components (A), (B), (C), and (D):
   (A) urethane (meth)acrylate having a polycarbonate skeleton and three or more polymerizable unsaturated groups in one molecule and having a weight average molecular weight in a range of 10,000 to 40,000;
   (B) urethane (meth)acrylate having a weight average molecular weight in a range of 1,000 or more and less than 10,000;
   (C) at least one compound selected from the group consisting of: a polymerizable unsaturated compound (c1) having three or more polymerizable unsaturated groups in one molecule and having a weight average molecular weight in a range of 280 or more and less than 1,000; a polymerizable unsaturated compound (c2) having an alicyclic structure and one or two polymerizable unsaturated groups in one molecule and having a weight average molecular weight in a range of 200 or more and less than 1,000; and a (meth)acrylamide compound (c3) having a weight average molecular weight in a range of 110 or more and less than 1,000; and
   (D) a photopolymerization initiator,
   wherein the urethane (meth)acrylate (A) is a reaction product of polycarbonate diol (a1), a polyisocyanate compound (a2), and a polymerizable unsaturated compound (a3) having a hydroxyl group, and the polymerizable unsaturated compound (a3) contains at least a polymerizable unsaturated compound (a3') having a hydroxyl group and two or more polymerizable unsaturated groups in one molecule.

2. The active energy ray-curable coating composition according to claim 1, wherein the polyisocyanate compound (a2) is a diisocyanate compound.

3. The active energy ray-curable coating composition according to claim 1, wherein the polymerizable unsaturated compound (a3') is a polymerizable unsaturated compound (a3") having one hydroxyl group and two or more polymerizable unsaturated groups in one molecule.

4. The active energy ray-curable coating composition according to claim 1, wherein a solid content of the component (A) is within a range of 10% by mass to 40% by mass, a solid content of the component (B) is within a range of 25% by mass to 70% by mass, and a solid content of the component (C) is within a range of 20% by mass to 50% by mass, with respect to a total solid content of the components (A), (B), and (C).

5. The active energy ray-curable coating composition according to claim 1, further comprising an ultraviolet absorber.

6. The active energy ray-curable coating composition according to claim 1, wherein a glass transition temperature of a cured coating film obtained by curing the active energy ray-curable coating composition is in a range of 40° C. to 90° C.

7. A cured coating film obtained by curing the active energy ray-curable coating composition according to claim 1 and having a molecular weight between crosslinks in a range of 200 g/mol to 900 g/mol.

8. A coated article comprising, on an object to be coated, the cured coating film obtained by curing the active energy ray-curable coating composition according to claim 1.

9. A method for forming a coating film, comprising:
   applying the active energy ray-curable coating composition according to claim 1 on an object to be coated to form an uncured coating film; and irradiating the uncured coating film with an active energy ray to cure the uncured coating film.

10. The active energy ray-curable coating composition according to claim 2, wherein the polymerizable unsaturated compound (a3') is a polymerizable unsaturated compound (a3") having one hydroxyl group and two or more polymerizable unsaturated groups in one molecule.

11. The active energy ray-curable coating composition according to claim 1, wherein a solid content of the component (A) is within a range of 15% by mass to 35% by mass, a solid content of the component (B) is within a range of 30% by mass to 60% by mass, and a solid content of the component (C) is within a range of 25% by mass to 45% by mass, with respect to a total solid content of the components (A), (B), and (C).

12. The active energy ray-curable coating composition according to claim 2, wherein a solid content of the component (A) is within a range of 10% by mass to 40% by mass, a solid content of the component (B) is within a range of 25% by mass to 70% by mass, and a solid content of the component (C) is within a range of 20% by mass to 50% by mass, with respect to a total solid content of the components (A), (B), and (C).

13. The active energy ray-curable coating composition according to claim 3, wherein a solid content of the component (A) is within a range of 10% by mass to 40% by mass, a solid content of the component (B) is within a range of 25% by mass to 70% by mass, and a solid content of the component (C) is within a range of 20% by mass to 50% by mass, with respect to a total solid content of the components (A), (B), and (C).

14. The active energy ray-curable coating composition according to claim 10, wherein a solid content of the component (A) is within a range of 10% by mass to 40% by mass, a solid content of the component (B) is within a range of 25% by mass to 70% by mass, and a solid content of the component (C) is within a range of 20% by mass to 50% by mass, with respect to a total solid content of the components (A), (B), and (C).

15. The active energy ray-curable coating composition according to claim 1, further comprising a light stabilizer.

* * * * *